United States Patent
Georgiev et al.

(10) Patent No.: US 10,394,004 B2
(45) Date of Patent: Aug. 27, 2019

(54) SYSTEMS AND DEVICES HAVING SINGLE-SIDED WAFER-LEVEL OPTICS

(71) Applicant: QUALCOMM Incorporated, San Diego, CA (US)

(72) Inventors: Todor Georgiev Georgiev, Sunnyvale, CA (US); Wen-Yu Sun, Santa Clara, CA (US); Zheng-wu Li, Milipitas, CA (US); Jon Lasiter, Stockton, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 15/275,148

(22) Filed: Sep. 23, 2016

(65) Prior Publication Data

US 2017/0285308 A1 Oct. 5, 2017

Related U.S. Application Data

(60) Provisional application No. 62/318,681, filed on Apr. 5, 2016, provisional application No. 62/331,283, filed on May 3, 2016.

(51) Int. Cl.
*G02B 27/10* (2006.01)
*G02B 13/00* (2006.01)
(Continued)

(52) U.S. Cl.
CPC .......... *G02B 13/0085* (2013.01); *B32B 37/12* (2013.01); *B32B 2307/40* (2013.01);
(Continued)

(58) Field of Classification Search
CPC .... G02B 3/005; G02B 3/0062; G02B 3/0068; G02B 3/0006; G02B 3/0037;
(Continued)

(56) References Cited

U.S. PATENT DOCUMENTS 6,096,155 A 8/2000 Harden et al.
8,023,208 B2 * 9/2011 Shyu .................... G02B 13/001
359/619
(Continued)

FOREIGN PATENT DOCUMENTS

WO WO-2009076787 A1 6/2009
WO WO-2015050499 A1 4/2015

OTHER PUBLICATIONS

Bruckner A., et al., "Multi-Aperture Optics for Wafer-Level Cameras" Journal of Micro Nanolithography, MEMS, and MOEMS, vol. 10, Issue 4, Nov. 21, 2011, pp. 11.
(Continued)

*Primary Examiner* — William Choi
(74) *Attorney, Agent, or Firm* — Paradice and Li LLP

(57) ABSTRACT

An optical system may include a lens assembly that has two or more single-sided wafer level optics (WLO) lenses arranged to propagate light. The optical system can further include an image sensor, wherein the lens assembly is arranged relative to the image sensor to propagate light received at a first surface of the lens assembly, through the two or more single-sided WLO lenses and to the image sensor. In some embodiments, the optical system further includes a camera which includes the lens assembly and the image sensor. In various embodiments, a smart phone, a tablet computer, or another mobile computing device may include such a camera. In some embodiments, the at least two single-sided wafer level optics (WLO) lenses are each separated by a gap G, wherein the gap may be different between each of the single-sided lenses, and the gap G may be zero.

28 Claims, 14 Drawing Sheets

(51) Int. Cl.
    *B32B 37/12*      (2006.01)
    *G02B 5/00*      (2006.01)
    *G02B 27/00*      (2006.01)

(52) U.S. Cl.
    CPC .......... *G02B 5/005* (2013.01); *G02B 13/0045* (2013.01); *G02B 27/0025* (2013.01)

(58) Field of Classification Search
    CPC   G02B 27/095; G02B 27/0961; G02B 3/0012; G02B 3/0075
    USPC ........................................ 359/619, 621, 622
    See application file for complete search history.

(56) References Cited

U.S. PATENT DOCUMENTS

| | | | |
|---|---|---|---|
| 8,432,625 | B2 | 4/2013 | Duparre et al. |
| 8,804,255 | B2 | 8/2014 | Duparre |
| 8,885,257 | B2 * | 11/2014 | Ovrutsky .............. H04N 5/2257 |
| | | | 359/621 |
| 9,638,883 | B1 * | 5/2017 | Duparre ................. G02B 7/003 |
| 2003/0223722 | A1 * | 12/2003 | Sugita ...................... G02B 6/13 |
| | | | 385/129 |
| 2011/0222171 | A1 | 9/2011 | Kintz et al. |
| 2012/0033125 | A1 | 2/2012 | Tang et al. |
| 2012/0133916 | A1 | 5/2012 | Ovrutsky et al. |
| 2015/0036046 | A1 | 2/2015 | Rudmann et al. |
| 2015/0333094 | A1 | 11/2015 | Wan et al. |
| 2016/0004049 | A1 | 1/2016 | Yin et al. |
| 2017/0097497 | A1 * | 4/2017 | Cheng .................... G02B 1/041 |

OTHER PUBLICATIONS

International Search Report and Written Opinion—PCT/US2017/017772—ISA/EPO—dated Oct. 10, 2017.
Partial International Search Report—PCT/US2017/017772—ISA/EPO—dated May 23, 2017.

\* cited by examiner

Tolerances

| | |
|---|---|
| Lens Thickness (um) | ±1 |
| Buffer Layer Thickness (um) | ±1 |
| Glass Thickness (um | ±5 |
| Air Gap (um) | ±2 |
| Lens Decenter (um) | ±2 |
| Lens Tilt (Degree) | ±0.025 |
| Aspherical Surface Accuracy (nm) | ±75 |
| Refractive Index | ±0.001 |
| Abbe Number | ±1 |

FIG. 8

Yield Rate With Tolerances

| 200LP/mm | | |
|---|---|---|
| Yield Rate | > | MTF |
| 90% | > | 0.416 |
| 80% | > | 0.463 |
| 50% | > | 0.536 |
| 20% | > | 0.590 |
| 10% | > | 0.609 |

| 450LP/mm | | |
|---|---|---|
| Yield Rate | > | MTF |
| 90% | > | 0.165 |
| 80% | > | 0.181 |
| 50% | > | 0.226 |
| 20% | > | 0.269 |
| 10% | > | 0.288 |

FIG. 9

SYSTEMS AND DEVICES HAVING SINGLE-SIDED WAFER-LEVEL OPTICS

CROSS-REFERENCE TO RELATED APPLICATIONS

The present application claims the benefit of U.S. patent application Ser. No. 62/318,681 filed Apr. 5, 2016, entitled "SYSTEMS AND DEVICES HAVING SINGLE-SIDED WAFER-LEVEL OPTICS" and U.S. Patent Application Ser. No. 62/331,283 filed on May, 3, 2016, entitled "SYSTEMS AND DEVICES HAVING SINGLE-SIDED WAFER-LEVEL OPTICS," both of which are assigned to the assignee hereof, the contents of which are both hereby incorporated by reference herein.

TECHNICAL FIELD

The systems and methods disclosed herein are directed to wafer level optics, and, more particularly, to single-sided wafer level optics lenses in optical systems, for example, cameras, smart phones, and tablet computers.

BACKGROUND

A wafer-level camera is a camera having a small footprint that can be utilized in electronic devices having a thin form factor, for example a mobile phone, notebook computer, tablet computer, and the like. Such wafer-level cameras include optics to form an image and an image sensor for sensing the image. To form a high quality image, the optics of the camera module may include several lenses, sometimes separated by spacers, that require precise alignment.

The wafer-level camera is typically manufactured by stacking and bonding wafers having optical components using alignment and bonding techniques. For example, a sensor water having a number of image sensors arranged in an array or grid pattern may be provided first, possibly with a cover glass layer for protection of the sensor substrate. A wafer having an array of lenses, known as a lens plate, is fabricated by providing a water and separately forming a lens surface on each side of the wafer using semiconductor techniques. A lens surface on a first side of the wafer is formed and then a second lens surface is formed on the second side. Each lens of the lens plate is then aligned with one of the image sensors. Separately forming the lens surfaces includes the steps of fabricating and aligning the lens surfaces of the first side with the lens surface of the second side, and such aligning can be difficult and error-prone when done during the fabrication stage.

SUMMARY

Manufacturing of a lens plate including double sided wafer level optics (WLO's) for use in cameras using techniques from semiconductor manufacturing can lead to the following problems: (1) certain lens shapes exist that are not possible to manufacture using standard wafer level manufacturing techniques; (2) alignment of the lenses on each side of the water may not be optimized for improvements needed for competitive smart phone camera image quality (e.g., decreases in f-number as wafer-level technology improves); and (3) the machines and techniques used in wafer level manufacturing are not optimized for wafer-level lens manufacturing where replication and alignment may be required during at the same manufacturing step. Conventional machines and wafer level manufacturing techniques for wafer alignment and lens replication may not be able to achieve alignment of the lens surfaces up to 1 micron precision. Such precision may be needed in order to produce high-resolution images on cameras having, for example, image sensors of 8 megapixels or more. Thus, for commercial mobile camera applications (e.g., cellular telephone applications, tablet computer applications, etc.) lens manufacturers may prefer not to use double-sided WLOs.

The aforementioned problems, among others, are addressed in some embodiments by the disclosed WLO's and lens stacks described herein. Various embodiments replace one or more double-sided WLO's used in some applications with a plurality of WLO's having a lens surface on one side of the wafer. Such WLO's are hereinafter referred to as "single-sided WLO's." For example, in some embodiments, a lens stack comprising exclusively single-sided WLO's.

One innovation includes an optical system, including a lens assembly including two or more single-sided WLO lenses arranged to propagate light. The optical system can include an image sensor, where the lens assembly is arranged relative to the image sensor to propagate light received at a first surface of the lens assembly, through the two or more single-sided WLO lenses and to the image sensor. The lens assembly may include at least three single-sided WLO lenses. In various embodiments, the optical system includes at least four single-sided WLO lenses, or five, or six, or seven, or more single-sided WLO lenses. In some embodiments, lens assembly includes at least one double-sided WLO lenses. In some embodiments, the lens assembly includes only single-sided WLO lenses. The optical system may also include a camera that includes the lens assembly and the image sensor. In various embodiments, the at least two single-sided WLO lenses may be each separated by a gap G, where the gap may be different between each of the single-sided lenses, and the gap G may be zero.

Accordingly, one aspect relates to an optical system. The optical system comprising a lens assembly including two or more single-sided water level optics (WLO) lenses arranged to propagate light.

In some embodiments, the optical system further includes an image sensor. The lens assembly may be arranged relative to the image sensor to propagate light received at a first surface of the lens assembly, through the two or more single-sided WLO and to the image sensor. The optical system may include any number of single-sided WLO's. The optical system may also include a camera comprising the lens assembly and the image sensor.

In some embodiments, the lens assembly includes two or more single-sided WLO's arranged to propagate light in a substantially similar manner to one or more double-sided WLO's. In some embodiments, the single-sided WLO's are each separated by a gap G, and the gap may be different between each of the single-sided lenses. In some embodiments, the gap G may be zero.

In some embodiments, each single-sided WLO includes a wafer having a first and second side and a lens surface replicated onto the first side of the wafer. The wafer may be a glass wafer. The lens surface may be replicated of at least one of an epoxy and transparent material. An adhesive layer may be disposed between the second surfaces of each wafer of two single-sided WLO's. The adhesive layer may be configured to facilitate substantially precise alignment between the two single-sided WLO's. In some embodiments, the second surface of each wafer of two single-sided WLO's are directly bonded using at least one of atomic and molecular forces, which may not include glue therebetween.

According to another aspect, an optical system is disclosed. This optical system includes two or more single-sided WLO's. Each single-sided WLO includes a glass wafer having a first and second surface, and a lens surface replicated onto a transparent material deposited on the first side of the glass wafer. The optical system also includes a lens assembly comprising the two or more single-sided WLO, such that the lens surfaces of the two or more single-sided WLO's are arranged to be effectively equivalent to an arrangement that is not achievable using a double-sided WLO.

According to another aspect, an optical system is disclosed. This optical system includes two or more single-sided WLO. Each single-sided WLO includes a glass wafer having a first and second surface and a lens surface replicated onto a transparent material deposited on the first side of the glass wafer. In some embodiments, the optical system also includes an adhesive layer disposed between the glass wafers of the two or more single-sided WLO's, such that the adhesive layer is disposed on the second surface of each glass wafer. The optical system also includes a lens assembly comprising the two or more single-sided WLO's, wherein the adhesive layer is configured to facilitate a substantial advantage in alignment between the two single-side WLO's. In another embodiment, the optical system may include a lens assembly comprising the two or more single-sided WLO's. The second surface of each wafer of two single-sided WLO's are directly bonded using at least one of atomic and molecular forces, such that there is no adhesive layer between the second surface of each water of two single-sided WLO's.

According to another aspect, a method of fabricating an optical system is disclosed. The method includes forming a plurality of lenses on a glass wafer. Each lens of the plurality of lenses includes a lens surface disposed on a first side within an area of the glass wafer. The method also includes separating the plurality of lenses to form a plurality of single-sided wafer level optics (WLO's), and aligning, after separating the plurality of lenses, a first single-sided WLO with one or more optical elements to produce the optical system.

In some embodiments, the method may include depositing a transparent material on the first side of the glass wafer and replicating the plurality of lens surfaces onto the transparent material. The first single-sided WLO may comprise a lens surface having an optical axis that is misaligned relative to the glass wafer due to forming the plurality of lenses. In some embodiments, the one or more optical elements comprises a second single-sided WLO having a lens surface formed on a first side of an area of a second glass wafer and having a second optical axis. The optical axis of the first single-sided WLO may be aligned with the second optical axis of the second single-sided WLO.

In some embodiments, the method may also include depositing an adhesive layer between the glass wafers of the first single-sided WLO and the second single-sided WLO. The adhesive layer may be disposed on the second surface of each glass wafer, such that the adhesive layer is configured to facilitate a substantial advantage in alignment between the first single-sided WLO and the second single-sided WLO. In another embodiment, the method may include directly bonding the first single-sided WLO and the second single-sided WLO via at least one of atomic and molecular forces, such that there is no adhesive layer between the second surface of each wafer of two single-sided WLO's

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

FIG. 8 illustrates an example of table of tolerances of the example optical system embodiment shown in FIGS. 6A and 6B.

FIG. 9 illustrates an example of table of yield rates for various tolerances of the optical systems of FIGS. 6A and 6B.

DETAILED DESCRIPTION

Introduction

Embodiments relate to optical systems and techniques for manufacturing wafer-level optics (WLO's). One disclosed optical system comprises a lens stack comprising a plurality of single-sided WLO's. One or more of the single-sided WLO's can replace one or more double-sided WLO's in the lens stack. In another embodiment, a lens stack comprises one or more one-sided WLO lenses. In various embodiments, an arrangement of lenses (for example, a lens stack or a lens assembly) may include a plurality of one-sided WLO lenses and other optical components configured for propagating light through an optical system. The "other" optical components may include one or more double-sided WLO lenses and other optical elements (for example apertures, reflective surfaces, prisms, etc.).

The systems and methods disclosed herein are directed to wafer level optics, and, more particularly, to lens arrangements that include a plurality of single-sided wafer level optics lenses in optical systems, for example, cameras, smart phones, and tablet computers.

A mobile camera is a broad term that generally refers to a camera having a small footprint that is utilized in electronic devices having a thin form factor, for example a mobile phone, notebook computer, tablet computer, and the like. Such mobile cameras may include one or more wafer-level optics (WLO) in an optical image chain that can be used to control light propagating towards an image sensor. To form a high quality image, the WLO may need to be manufactured with high precision.

As used herein, the term "wafer" generally refers to optical wafers, for example glass, optical grade plastics, or other optical material. Such optical wafers can be approximately 8 inches in diameter and approximately 500 microns thick, in some embodiments. Other configurations are possible, for example, the wafer may be 200 microns thick or 1-2 millimeters thick. The configuration may depend on the desired optical properties and effects of the wafer.

Various embodiments will be described below in conjunction with the drawings for purposes of illustration. It should be appreciated that many other implementations of the disclosed concepts are possible, and various advantages can be achieved with the disclosed implementations.

Overview of Example Double-Sided WLO

Figure 1:
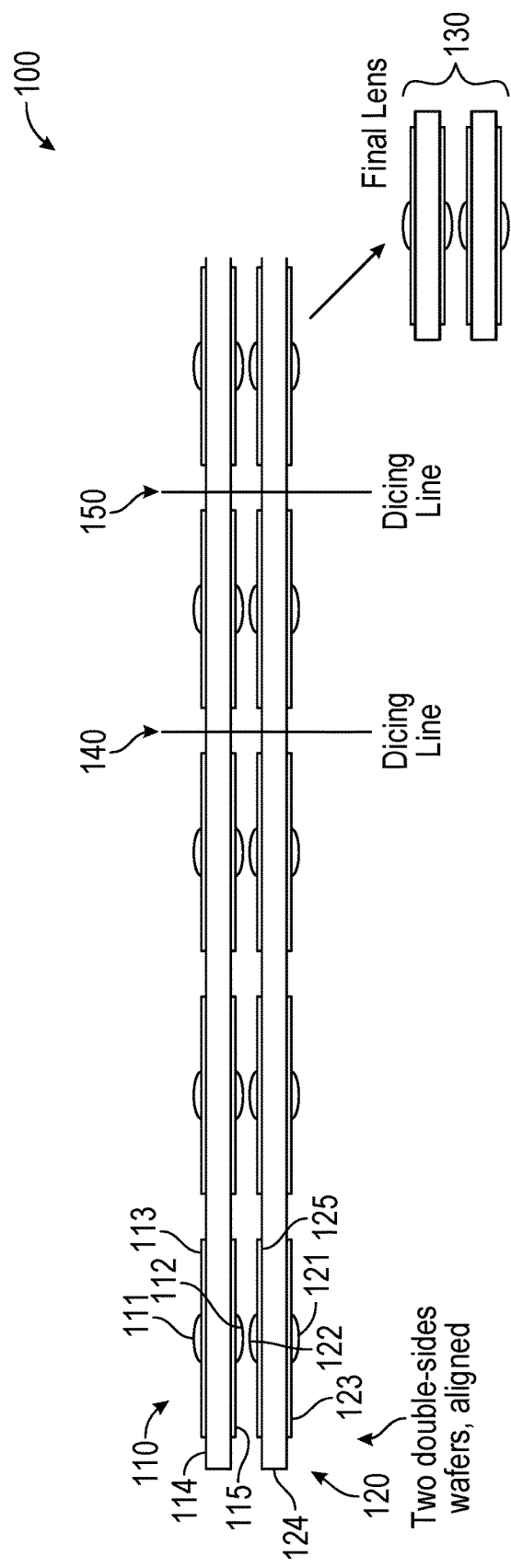
FIG. 1 illustrates a cross-section view of an example of multiple double-sided wafer-level optics forming a lens stacks that can be diced.

FIG. 1 illustrates a cross-section view of an example multiple bonded double-sided WLO forming multiple lens stacks that can be diced. FIG. 1 illustrates plurality of lens stacks 100 in an array or grid pattern comprising multiple double-sided WLO (e.g., double-sided WLO 110 and 120) that are bonded together.

Each side of a double-sided WLO lens is separately formed using semiconductor techniques. For example, wafer 114 may be provided having an epoxy deposited on a first side of the wafer 114. Lenses 111 may be formed by replicating multiple lens surfaces onto the epoxy in an array or grid pattern. For example, the desired shape of lens 111 may be imprinted or pressed into the epoxy in the array or grid pattern. The lens 111 is shown in FIG. 1 as being a concave lens shape of positive curvature, however any lens shape may possible (e.g., a convex lens of negative curvature). The epoxy may then be illuminated with a ultra-violet (UV) light to cure (e.g., harden) the multiple lens surfaces to form lens 111. In some implementations, the lens 111 may be formed on a buffer layer 113 disposed between the wafer 114 and the lens 111. Once the first side of the wafer 114 is cured, an epoxy is applied to the second side of the wafer 114, and another lens 112 may be replicated onto the epoxy on the second side in a corresponding array or grid pattern. Forming the lens 112 includes the step of aligning the lens 112 with the lens 111, which can be difficult and error-prone when done during the fabrication stage. Lens 112 may have the same or different lens shape as lens 111.

A second wafer 124 may be provided that is similar to wafer 114. The second wafer 124 may comprise lens 121 and 122 formed thereon. Lens 121 and 122 may be formed in a manner similar to lens 111 and 112 of wafer 114.

FIG. 1 also illustrates a typical WLO manufactured by stacking and bonding the multiple wafers 114 and 124. For example, wafers 114 and 124 having lenses 111, 112 and lenses 121, 122 formed thereon may be stacked such that the various lenses are aligned to form a wafer stack. The wafer stack may also include various other wafers having a number of components not shown in the figure, such as spacer wafers between the wafers 114 and 124 and a sensor wafer having a number of image sensors aligned with the various lenses of the lens stack. The stacked wafers are then bonded and diced along dice lines 140 and 150 into individual wafer-level lens stacks (e.g., lens stack 130) each comprising two or more double-sided WLO's. In some embodiments, the wafer-level lens stack may not include the image sensors until after dicing, and in such embodiments the wafer-level stacks may then be aligned with an image sensor to form a mobile camera. Thus, the lenses of the lens stacks are aligned during the fabrication process.

Figure 2:
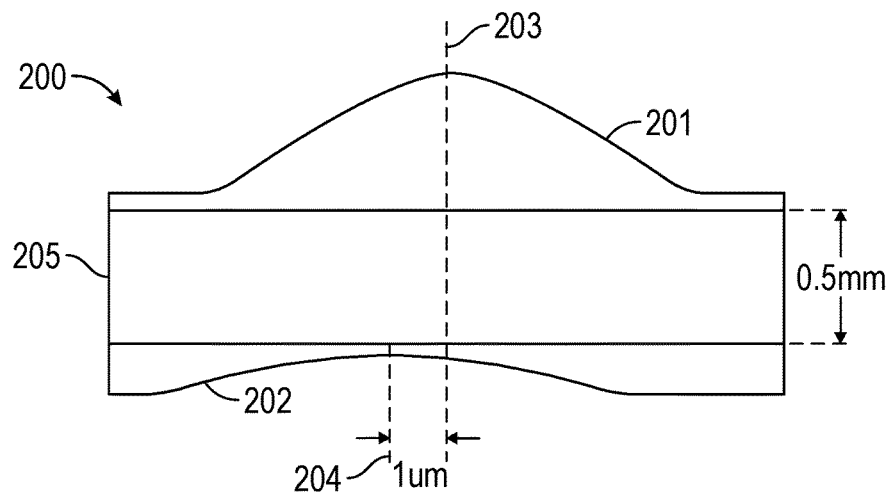
FIG. 2 illustrates a cross-sectional view of an example of a double-sided wafer-level optic having misalignment along a central axis.
Figure 3:
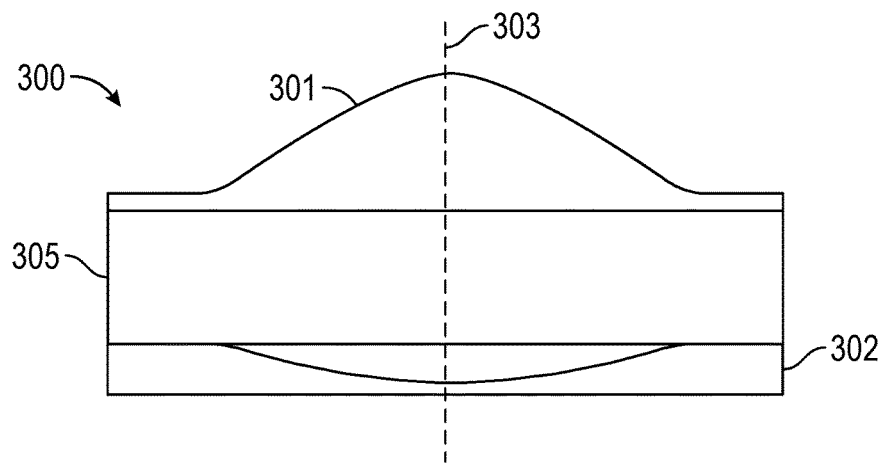
FIG. 3 illustrates a cross-sectional view of an example of a desired double-sided wafer-level optic configuration that is difficult (if not impossible) to make as a double-sided WLO.

FIGS. 2 and 3 illustrate cross-sectional views of example double-sided WLO's experiencing problems arising from the manufacture of double-sided WLO's. For example, manufacturing double-sided WLO's (e.g., as illustrated in FIG. 1) using conventional semiconductor techniques can lead to the following problems: (1) alignment of the lenses on each side of the wafer may not be optimized for improvements in mobile camera image quality (e.g., decreases in f-number as wafer-level technology improves) (e.g., FIG. 2); (2) certain lens shapes exist that are not possible to manufacture using standard semiconductor manufacturing techniques (e.g., FIG. 3); and (3) the machines and techniques used in semiconductor manufacturing are not optimized for wafer-level lens manufacturing where replication and alignment may be required during at the same manufacturing step. Conventional machines and WLO manufacturing techniques for wafer alignment and lens replication may not be able to achieve alignment of the lens surfaces up to 1 micron precision. Such precision may be needed in order to produce high resolution images on cameras having, for example, image sensors of 8 megapixels or more. Thus, for commercial mobile camera applications (e.g., cellular telephone applications, tablet computer applications, etc.) lens manufacturers may prefer not to use double-sided WLO's.

FIG. 2 illustrates a cross-sectional view of an example double-sided WLO having misalignment along a central axis 203. FIG. 2 depicts double sided WLO 200 having a first lens 201 formed on a first side of wafer 205 and a second lens 202 formed on a second side of wafer 205. In some embodiments, the wafer 205 can have a thickness ranging from 200 microns to 500 microns. As illustrated in FIG. 2, the wafer 205 has a thickness of 500 microns. Lens 201 has a center axis 203 and lens 202 has a center axis 204.

As shown in FIG. 2, the optical axis of the lens 201 and 202 may be shifted relative to each other by some amount. In order to produce high-resolution images for cameras having, for example, 8 megapixels or more or increasingly improved f/# (e.g., an f/3 lens or better), the alignment of the first and second lenses 201 and 202 requires precision of 2 microns or better, and optimally in some embodiments precision of approximately 1 micron or better is needed. Alignment refers to position of the center of each lens along the optical axis of the double-sided WLO (e.g., aligning the center axis 203 and 204).

However, conventional manufacturing techniques of double-sided WLO's do not support sub 2-micron precision. The replication process and alignment process is performed at the same step, and the conventional tools used in semiconductor manufacturing are not currently configured to replicate the lens and provide precise alignment. Precision deficiencies may result from replicating a first lens 201, then replicating a second lens 202 on the opposite side of the wafer as described in connection to FIG. 1. Imprinting may result in forces applied to the surfaces of the wafer, thereby affecting the alignment of two lenses. Thus the center axis may be shifted in a direction perpendicular to the optical axis (as shown in FIG. 2) or tilted at some angle relative to each other (not shown) due to non-uniform pressure of the imprinting process.

FIG. 2 illustrates the 1 micron precision tolerance that is desired from mobile camera applications. FIG. 2 does not show the amount of misalignment occurring during the manufacturing of the double-sided WLO 200.

FIG. 3 illustrates a cross-sectional view of an example of a double-sided WLO configuration that is difficult (if not impossible) to make. FIG. 3 depicts double-sided WLO 300 having a first concave lens 301 on wafer 305 having an optical axis 303. FIG. 3 also depicts a convex lens 302 on the second side of wafer 305. As illustrated, the convex lens has a flat surface opposite the second side of wafer 305 and a convex surface facing the second side of wafer 305. In some embodiments, a space is formed between the second side of wafer 305 and the convex surface of lens 302. The space may be air or some other material based on the desired optical properties.

As described above, the configuration of double-sided WLO 300 may be difficult to manufacture through the use of current semiconductor manufacturing techniques. For example, the lenses of a double-sided WLO are formed by imprinting an epoxy layer deposited on the wafer 305. Thus, it may not be possible to imprint lens 302 by applying pressure in a direction toward the second surface of wafer 305.

Thus, current commercial mobile camera applications (e.g., cellular phones, tablet computers, etc.) do not utilize WLO. The manufacturers of such cameras seeking high-resolution images for cameras having, for example, 8 megapixels, may use more expensive approaches using injection molded plastic lenses.

Overview of Example Single-Sided WLO

Figure 4:
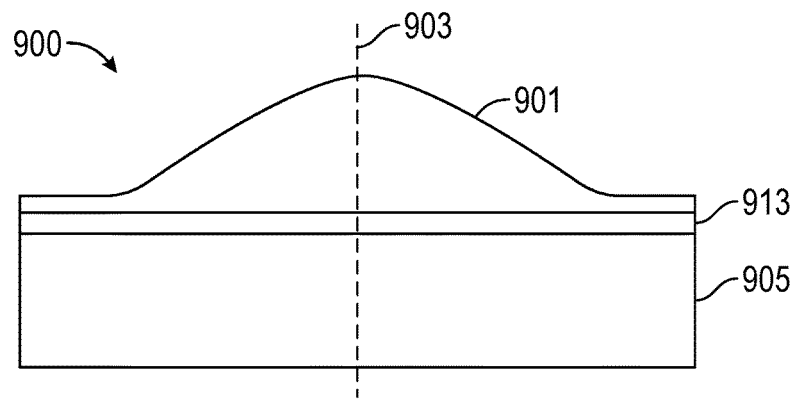
FIG. 4 illustrates a cross-sectional view of an example single-sided wafer level optic element.

FIG. 4 illustrates a cross-sectional view of an example single-sided WLO. Such single-sided WLO's may be used in any optical system or lens stack. Single-sided WLO 900 may be formed in an array or grid pattern formed on a wafer 905 comprising multiple single-sided WLO's.

The single-sided WLO 900 may be manufactured using conventional semiconductor manufacturing techniques. For example, wafer 905 may be provided having an epoxy deposited on one side of the wafer 905. The epoxy may be any type of epoxy or resin selected to provide the desired optical characteristics and properties, for example, Himax_UV1, Himax_UV2, Himax_UV3, or others. Replicating multiple lens surfaces onto the epoxy in an array or grid pattern may form lenses 901. For example, the desired shape of lens 901 may be imprinted or pressed into the epoxy in the array or grid pattern. The lens 901 is illustrated in FIG. 4 as being a concave lens having positive curvature, however any lens shape may possible (e.g., a convex lens of negative curvature or variable lens shapes). The epoxy may then be illuminated with a ultra-violet (UV) light to cure (e.g., harden) the multiple lens surfaces to form lens 901. Once epoxy is cured, lens 901 is formed having a center axis 903 and an optical power based on the shape of the lens 901. The wafer 905 having multiple single-sided WLO's in an array or grid pattern may then be diced for form individual single-sided WLO's (e.g., single-sided WLO 900).

In some embodiments, a buffer layer may be deposited between the lens surface and the wafer. For example, buffer layer 913 of epoxy or resin may be deposited on wafer 905 prior to imprinting lens 901. Thus, buffer layer 913 may be positioned between lens 901 and wafer 905. The buffer layer may be approximately 70 microns thick, but other configurations are possible. In some embodiments, the buffer layer may be made of the same epoxy as the lenses 901 are made from, or may be a different epoxy or resin. Without subscribing to a particular scientific theory, it is believed that the buffer layer is configured to improve the precision of replicating and forming the lens associated therewith (e.g., lens 901 and buffer layer 913).

In previous implementations wafer-level optics, the sub 2 micron tolerances, or optimally approximately 1 microns or better, alignment was not needed to produce high-resolution images. For example, the cameras used in cell phones or tablet computers did not have image sensors of 8 megapixels or greater. These cameras did not require the high precision offered by single-sided WLO's, and thus manufactures accepted the problems of double-sided WLO's. Similarly, these cameras had lower performance specifications (e.g., higher f/#, such as f/4 or greater), thus imperfections in the WLO's were not controlling of the cameras performance. As these specifications of the image sensor and cameras have improved, the precision and tolerance of the lenses therein need to be improved as well to permit the capture of high-resolution images. Prior to implementation of the embodiments disclosed herein, manufacturers turned to the conventional injection molded plastic lenses opposed to WLO's.

One non-limiting advantage of using single-sided WLO's is that multiple single-sided WLO's may be used in place of one or more double-sided WLO's. The multiple single-sided WLO's may be more precisely aligned relative to each other to form a lens stack. The alignment of two or more lenses of a lens stack may be aligned after replication of the lenses during assembly of the lens stack. For example, a single-sided WLO (e.g., single-sided WLO 900 of FIG. 4) may be fabricated, due to manufacturing variations, such that the optical axis of the lens surface (e.g., axis 903) is misaligned relative to the wafer 905. The lens surface may not be exactly centered on the wafer 905 or the axis 903 may be tilted relative to normal of the water 905. A second single-sided WLO may be aligned or similarly misaligned relative to its corresponding wafer. However, after the single-sided WLO are manufactured and diced, the individual single-sided WLOs can be aligned such that the single-sided WLO share a common optical axis (e.g., axis 903), regardless as to whether each single-sided WLO is precisely aligned relative to its respective wafer. Thus, permitting increase precision within a tolerance of 2 microns or better, and optimally in some embodiments within a tolerance of approximately 1 micron. Such alignment permits high-resolution images for cameras having, for example, 8 megapixels or more. Furthermore, such alignment may be needed to facilitate the assembly of mobile cameras having improved specifications (e.g., f/# of f/3 or less). Alignment refers to positioning of the center of each single-sided WLO along an optical axis passing through the lens stack.

Another non-limiting advantage of the single-sided WLO's is permitting the use of machines or tools specially designed for a single use. For example, a semiconductor manufacturing machine or tool specifically designed to replicate the lenses on the wafers. Another example machine is one specifically designed to align the multiple single-sided WLO's in a lens stack. Such specifically designed machines and tools may provide improved precision for the specifically designed process and may provide flexibility to the manufacturers of the single-sided WLO. For example, individual single-sided WLO's may be fabricated, diced, and precisely aligned with other single-sided WLO's, traditional glass lenses, or other optical elements to optimize the optical system for high-resolution imaging. Once the system is precisely aligned that various components may be bonded to maintain the alignment. In contrast, a lens plate of double-sided WLO's are fabricated, including misalignments as described above in connection to FIG. 2, and aligned with other optical components or lens plates prior to dicing into individual lens stacks. Thus, it may not be possible to optimize the alignment of the various elements since each lens stack is already bonded.

Another non-limiting advantage is an increased freedom for design optimization of optical systems utilizing WLO's or lens stacks using WLO's. For example, the distances between the lenses of each single-sided WLO of a lens stack may be adjusted. during assembly of the optical system or lens stack. In some embodiments, the distances between the lenses of each single-sided WLO may be precisely controlled during optimization and alignment of the lens stack. Furthermore, atomic bonding, as described above in connection to FIG. 4, may permit the distance between each lens to be precisely controlled and unaffected by imprecisions in wafer surfaces or gluing procedures traditionally employed. Furthermore, the orientation of the surfaces (e.g., tilt, yaw, or roll of the WLO) may be adjusted relative to the surfaces of WLO, as described above. These adjustments may be made during alignment of the design of the optical system, separate from fabrication, to improve and correct for various optical aberrations (e.g., chromatic aberrations, spherical aberrations, image distortions, etc.) and/or manufacturing defects or variations. The above described adjustments to alignment may not have been possible in implementations of double sided WLO, because they are formed as a single WLO.

Yet another non-limiting advantage of using single-sided WLO's is that freedom to manufacture lens shapes and configurations that were previously not feasible. For example, single-sided WLO's may be made that are substantially equivalent to the previously un-feasible double-sided. WLO 300 of FIG. 3. That is, one or more single-sided WLO may be arranged to propagate light in a substantially similar manner to the double-sided WLO. For example, a double-sided WLO may have a desired shape that is feasible or not which may include an optical power and other optical properties. One or more single-sided WLO may be designed, arranged, and aligned to be effectively equivalent to the double-sided WLO, having the same or substantially equivalent optical properties of the double sided WLO (for example, as will be described in more detail below in connection to FIGS. 5-6B).

In some implementations, multiple single-sided WLO's, such as single-sided WLO's 900, may be provided and arranged in a lens stack. For example, each WLO may comprise an exposed side of the wafer not having a lens thereon. The exposed side of the wafers may be cleaned and polished in a manner similar to treatment of Si wafers in semiconductor manufacturing to remove imperfections from these surfaces and form a substantially flat clean surface. The exposed surfaces of two wafers may then be bonded by atomic or molecular forces using direct bonding techniques to bring the surfaces substantially close together having minimal or no imperfections therebetween. One non-limiting advantage of this technique, is that glue or other bonding materials used to bond the double-sided WLO's may not be required, thereby removing imperfections due to these bonding techniques. For example, where glue is used to bond the two surfaces, some residual glue may remain between two surfaces thereby making the distance between the surfaces hard to control and effectively undefined within a few microns. Another non-limiting advantage of this technique, is that the distance between the lenses of the single-sided WLO's may be precisely and optimally controlled to facilitate high-resolution imaging.

Example Optical System Comprising Multiple Single-Sided WLO's

Figure 5:
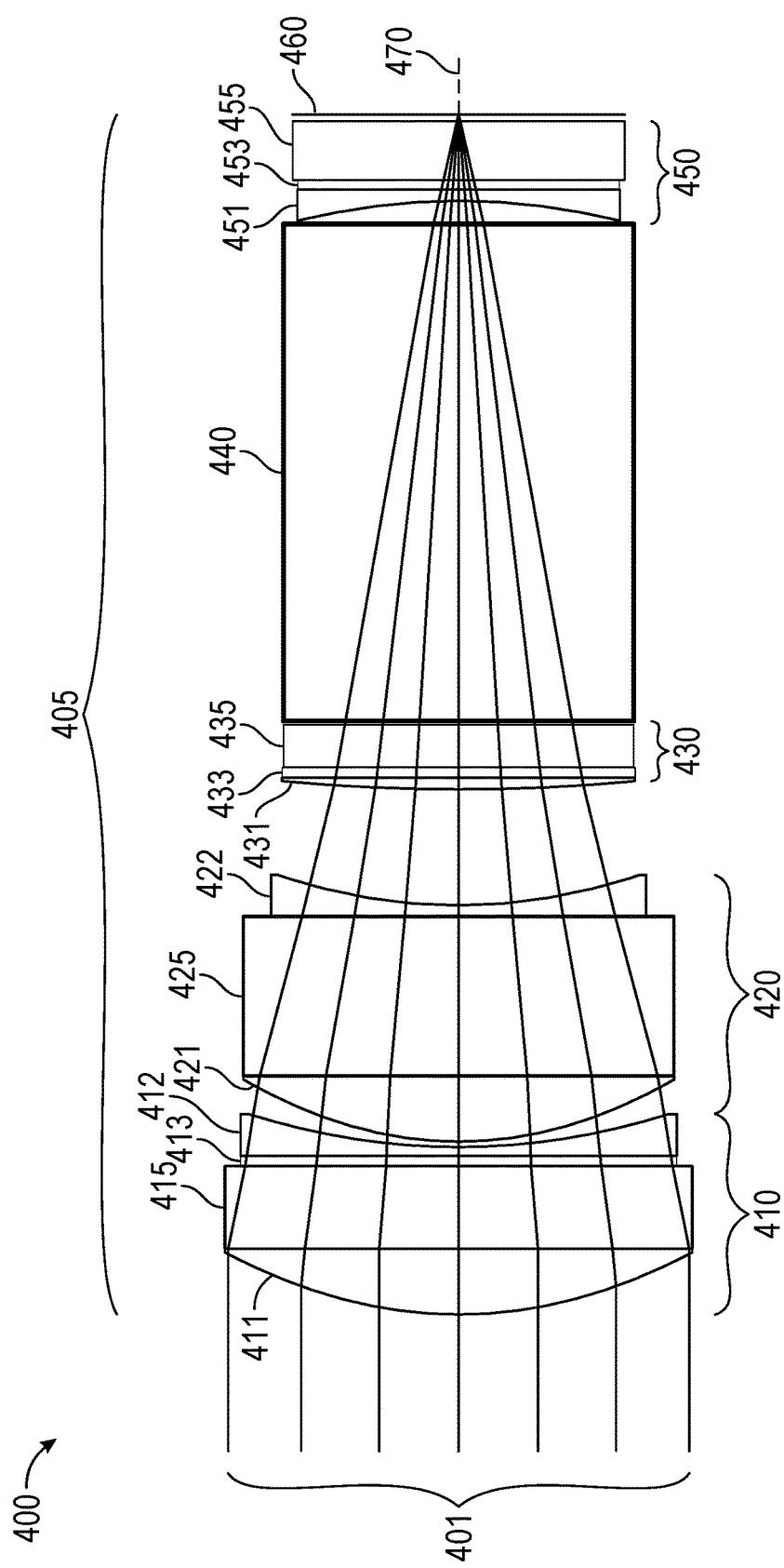
FIG. 5 illustrates an example layout of an embodiment of an optical system utilizing double-sided wafer-level optics.

FIG. 5 illustrates a layout of an example of optical system utilizing double-sided WLO. FIG. 5 illustrates an optical system 400 comprising a lens stack 405 and an image sensor 460. FIG. 5 also illustrates a simulated ray trace diagram tracing a path of light 401 through the lens stack 405 being incident on the image sensor 460. As illustrated in FIG. 5, the optical axes of the lens stack 405 and the imaging surface of the image sensor 470 are substantially parallel and coincident with the optical axis 470 such that, in this embodiment, the elements have approximately the same optical axis positioned along the optical axis 307. The simulation results can be obtained by ray tracing software (for example, Zemax™ SW).

Optical system 400 is only one embodiment of a possible optical system using WLO. The optical system 400 may be designed for use mobile cameras in cellular phones. However, other configurations are possible. There are an infinite number of possible configurations for optical systems that may be optimized for different applications. As such, the embodiment described herein is only one example of an optical system. The specific lens shapes, configurations, sizes, materials, and other specifications may be designed and optimized for the particular application for which the optical system is being designed.

Referring again to FIG. 5, in one embodiment, lens stack 405 includes double-sided WLO's 410 and 420 and single-sided WLO's 430 and 450. In some embodiments, the lens stack 405 also includes an optical element 440, which may be a glass prism configured to modify and adjust for aberrations, distortions, and diffractions of the light 401 as it passes through the optical system 400. As illustrated, double-sided WLO 410 includes concave lens surface 411, wafer 415, buffer 413, and concave lens surface 412. Double-sided WLO 420 includes concave lens surface 421, wafer 425, and concave lens surface 422. Single-sided WLO 430 includes concave lens surface 431, buffer layer 433, and wafer 435. Single-sided. WLO 450 includes convex lens 451, buffer layer 453, and wafer 455. In some embodiments, the diameter of the lenses in the lens stack 405 may be 5 mm or less.

For the embodiment shown in FIG. 5, the centers of the various components of optical system 400 are optimally aligned with the optical axis 470 of the optical system 400. For example, the centers are aligned within a tolerance of 2 microns or better, and optimally in some embodiments within a tolerance of approximately 1 micron or better. However, the embodiment of FIG. 5 is difficult, if not impossible, to achieve because sub 2 micron tolerances for alignment are not achievable when using double-sided WLO's (e.g., double-sided WLO's 410 and 420). Thus, FIG. 5 represents an optimally aligned, but unfeasible optical system 400.

Figure 6A:
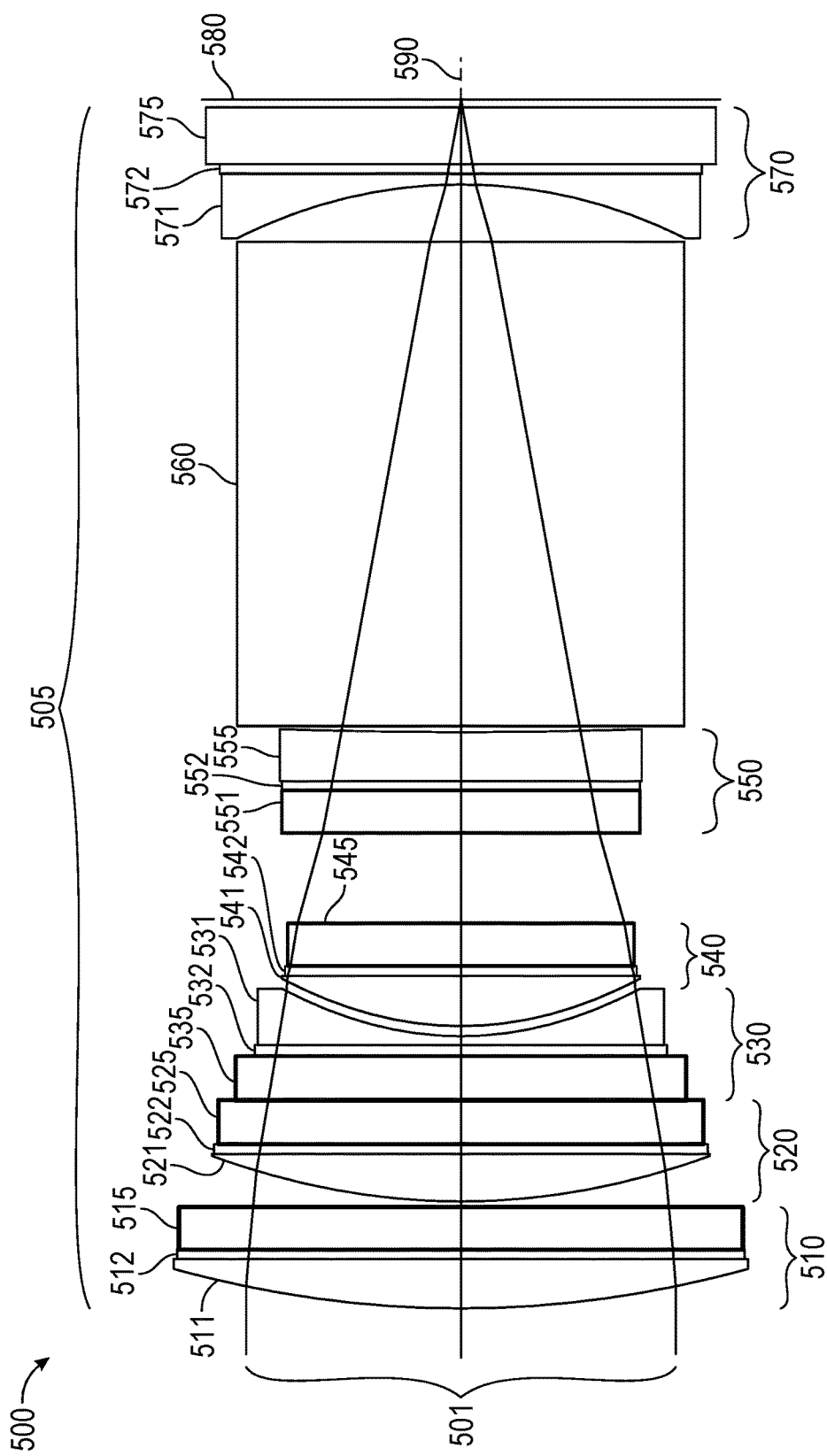
FIGS. 6A and 6B illustrates an example layer of an embodiment of an optical system utilizing single-sided wafer-level optics.
Figure 6B:
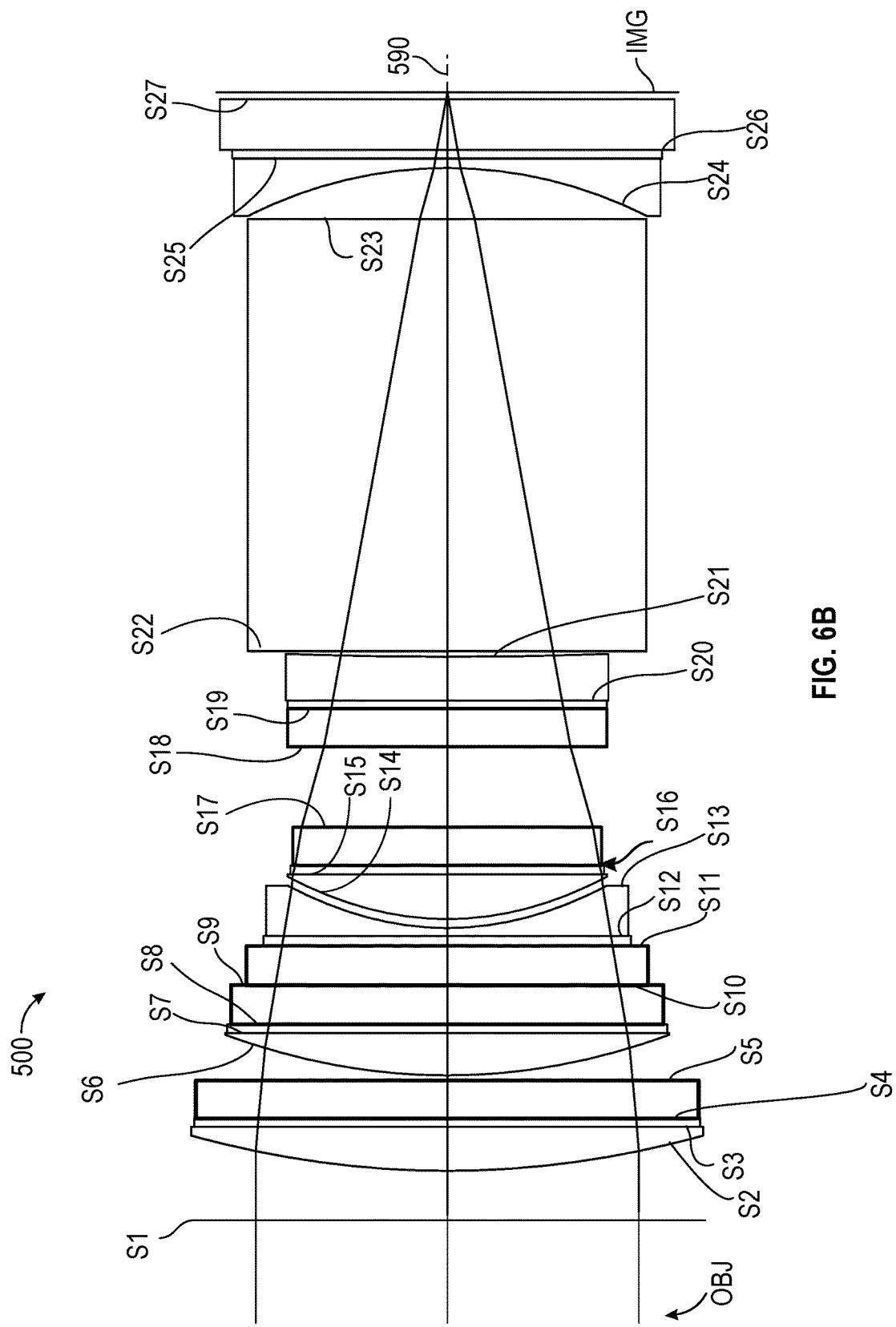

FIGS. 6A and 6B illustrates a layout of an optical system utilizing single-sided WLO's. FIG. 6A illustrates an optical system that is effectively equivalent to the optical system of FIG. 5, but using single-sided WLO's. For example, lenses 410, 420, 430, and 450 of FIG. 5 may be replaced with one or more lenses 510, 520, 530, 540, 550, and/or 570 of FIG. 6A, as described above in connection to FIG. 4. Some of the non-limiting advantages of the layout of FIG. 6A include, but are not limited to, that the single-sided WLO's are easier to manufacture with higher quality and provide an improved optical quality.

FIG. 6A illustrates a layout of an example optical system utilizing single-sided WLO's (e.g., single-sided WLO 900 of FIG. 5). FIG. 6A illustrates an optical system 500 comprising a lens stack 505 and an image sensor 580. The optical system 500 is an optical system designed to perform in a substantially similar manner to that of optical system 400 of FIG. 5, but using only single-sided WLO's, thereby improving the achievable performance of the optical system in accordance with the description herein and above.

FIG. 6A also illustrates a simulated ray trace diagram tracing a path of light 501 through the lens stack 505 being incident on the image sensor 580. As illustrated in FIG. 6A, the optical axes of the lens stack 505 and the imaging surface of the image sensor 580 are substantially parallel and coincident with the optical axis 590 such that, in this embodiment, the elements have approximately the same optical axis positioned along the optical axis 590. The simulation results can be obtained by ray tracing software (for example, Zemax™ SW).

As described above, optical system 500 is only one embodiment of a possible optical system using single-sided WLO. The optical system 500 may be designed for use mobile cameras in cellular phones. However, other configurations are possible. There are an infinite number of possible configurations for optical systems that may be optimized for different applications. As such, the embodiment described herein is only one example of an optical system. The specific lens shapes, configurations, sizes, materials, and other specifications may be designed and optimized for the particular application for which the optical system is being designed.

Referring again to FIG. 6A, in one embodiment, lens stack 505 includes single-sided WLO's 510, 520, 530, 540, 550, and 570. Lens stack 505 may also include waveguide 560. In some embodiments, the waveguide 560 is a glass prism configured to modify and adjust for aberrations, distortions, and diffractions of the light 501 as it passes through the optical system 500 in a manner similar to that of waveguide 440. As illustrated, single-sided WLO 510, 520, 530, 540, 550, and 570 each include a lens surface (e.g., concave lens surface 511, concave lens surface 521, concave lens surface 531, concave lens surface 541, concave lens surface 551, and convex lens surface 571, respectively); a buffer layer (e.g., buffer layers 512, 522, 532, 542, 552, and 572, respectively); and a wafer (e.g., wafers 515, 525, 535, 545, 555, and 575, respectively). Each single-sided WLO may be manufactured in a manner similar to that described above with reference to single-sided WLO 900 of FIG. 4. In some embodiments, the diameter of the lenses in the lens stack 405 may be 5 mm or less. In some embodiments, single-sided WLO's, for example WLO 525 and WLO 535, may be bonded by direct bonding techniques as described in connection to FIG. 4.

For the simulation shown in FIG. 6A, the centers of the various components of optical system 500 are optimally aligned with the optical axis 590 of the optical system 500. For example, the centers are aligned within a tolerance of 2 microns or better, and optimally in some embodiments within a tolerance of approximately 1 micron or better. Such tolerances are possible in real world applications, because, at least in part, optical system 500 utilizes single-sided WLO. Furthermore, the various other non-limiting advantages described above may also be applicable to optical system 500.

The lens construction and fabrication data for the example implementation of optical system 500 is set forth below in TABLE 1. The data in TABLE 1 is simulated at a temperature of 20° C. (68° F.) and standard atmospheric pressure (760 mm Hg). Measurements are in millimeters (mm) with the exception of wavelengths which are in nanometers (nm).

In the embodiment described in TABLE 1 the effective focal length is 6.00449 mm. Other configurations are possible. In TABLE 1, the first column "Item" identifies each optical element and each location, i.e. object plane, image plane, etc., with the same numeral or label as used in FIG. 6A. The second column identifies the "Surface" which is a list of the surface numbers of the object (line "1" in FIG. 6B and "Object" in TABLE 1), the Stop (iris) S16 and each of the actual surfaces of the lenses, as identified in FIG. 6B. For example, single-sided WLO 510 corresponds to surfaces S2-S5. Similar correspondence is shown for each single-sided WLO 520, 530, 540, 550, and 570.

FIGS. 6A and 6B illustrate the ray trace diagram of the embodiment shown in FIG. 6A including the thickness along the optical axis 590 and the material of each lens. The third column of TABLE 1 labeled "Separation" is the axial distance between that surface (third column) and the next surface along the optical axis 590 indicative of the thickness of each element of the optical system 500. The fifth and sixth columns of TABLE 1 relate to the "Material" between that surface (third column) and the next surface to the right in FIGS. 6A and 6B, with the column "Type" indicating whether there is a material (e.g., epoxy, glass, etc.) or empty space (Air) between those two surfaces. The materials are identified by optical glass or epoxy in the column "Name". For example, in the embodiment illustrated in FIGS. 6A and 6B, lens 511 has a thickness of approximately 350 microns and is made of HIMAX_UV1 epoxy. Similar data is shown for each lens 521, 531, 541, 551, and 571. Also, in the embodiment illustrated in FIGS. 6A and 6B and TABLE 1, the wafers 515, 525, 553, 545, 555, and 575 are each made of HIMAX_GLASS and have a thickness of approximately 300 microns and the buffer layers 512, 522, 532, 542, 552, and 572 are approximately 70 microns thick. Other configurations are possible.

For convenience, all of the lens glass has been selected from glass available from Schott AG and the column "Name" lists the Schott identification for each material type, but it is to be understood that any equivalent, similar or adequate materials may be used. The HIMAX_UV1 epoxy has the following refractive indices 1.53322215, 1.52990012, 1.5269674, 1.52411175, and 1.52251244 at respective wavelengths 470, 510, 555, 610, and 650 nanometers. The HIMAX_UV2 epoxy has the following refractive indices 1.59316122, 1.58616286, 1.58039463, 1.57524899, and 1.57231923 at respective wavelengths 470, 510, 555, 610, and 650 nanometers. The HIMAX_UV3 epoxy has the following refractive indices 1.52822251, 1.52626811, 1.52196040, 1.51969395, and 1.51775626 at respective wavelengths 470, 510, 555, 610, and 650 nanometers. The HIMAX_GLASS has the following refractive indices 1.51673321, 1.51398326, 1.51144706, 1.50907894, and 1.50756141 at respective wavelengths 470, 510, 555, 610, and 650 nanometers. The BK7 glass has the following refractive indices 1.52360494, 1.52076887, 1,51827403, 1,51590884, and 1.51452031 at respective wavelengths 470, 510, 555, 610, and 650 nanometers. The B33 glass has the following refractive indices 1.47742824, 1.47494102, 1.47270999 1.47060098, and 1.46934516 at respective wavelengths 470, 510, 555, 610, and 650 nanometers.

FIGS. 6A and 6B also show a layout of the embodiment including the radius of curvature and diameter (e.g., aperture stop) of each lens. The fourth column of TABLE 1 below, headed by the legend "Radius of Curvature," is a list of the optical surface radius of curvature for each surface, with a minus sign (−) meaning the center of the radius of curvature is to the left of the surface, as viewed in FIGS. 6A and 6B and "Infinity" meaning an optically flat surface. The seventh column of TABLE 1, headed "Aperture Diameter," provides the diameter for each surface through which the light rays pass. All of the maximum aperture diameters are given at a wavelength of 555 nanometers for an image diameter of about 3,605645 mm and F-numbers of about 2 at the Image Plane. For example, lens 511 has a radius of curvature of approximately 6.096 mm.

Lens 511 is also shown having aspheric higher order corrections defined by the polynomials of the $4^{th}$ and $6^{th}$ order, as described herein. Other configurations are possible, for example, as described in the optical prescription data in TABLE 1. Similar data is shown for each lens 521, 531, 541, 551, and 571. Other configurations are possible.

The asterisk (*) for surfaces S2, S6, S13, S14, S21, and S24 indicate these are aspheric surfaces for which the "radius of curvature" is a base radius. Without subscribing to a particular scientific theory, the use of aspherical surfaces provides for the correction of aberrations in the zoom lens while enabling a smaller overall size and a simpler configuration. The formula and coefficients for the surface profiles of aspheric surfaces 4 and 8 are governed by the following equation:

$$z = \frac{cy^2}{1+[1-(1+\kappa)c^2y^2]^{1/2}} + Ay^4 + By^6 + Cy^8 + Dy^{10} + Ey^{12} + Fy^{14}$$

where:
c=surface curvature (c=1/r where r is the radius of curvature)
y=radial aperture height of surface measured from the X and Y axis, where:
$y=(X^2+Y^2)^{1/2}$
κ=conic coefficient
A, B, C, D, E, F=$4^{th}$, $6^{th}$, $8^{th}$, $10^{th}$, $12^{th}$ and $14^{th}$, respectively, order deformation coefficients
z=position of a surface profile for a given y value or measured along the optical axis from the pole (i.e., axial vertex) of the surface. When the deformation coefficients are equal to zero the lens surface is conic. In some embodiments, the conic surface of the lenses may be spherical, elliptical, parabolic, or hyperbolic (e.g., when κ is set or selected to be 0, greater than negative 1, equal to negative 1, or less than negative 1. The conic coefficient may be selected as desired for a given optical system.

The coefficients for surface S2 are:
κ=0
A=−0.0040242261
B=−9.7137596×10$^{-6}$
C=0
D=0
E=0
F=0

The coefficients for surface S6 are:
κ=0
A=0.00084707207
B=−0.00047081134
C=0
D=0
E=0
F=0

The coefficients for surface S13 are:
κ=0
A=0.028310006
B=−0.014103647
C=0
D=0
E=0
F=0

The coefficients for surface S14 are:
κ=0
A=0.040702354
B=−0.012591511
C=0
D=0
E=0
F=0

The coefficients for surface S21 are:
κ=0
A=0.015482043
B=0.0017285538
C=0.001025584
D=0
E=0
F=0

The coefficients for surface S24 are:
κ=0
A=−0.018818695
B=−0.0026769359
C=0.0010489939
D=−9.257069×10$^{-5}$
E=0
F=0

FIGS. 6A and 6B also illustrate the ray trace diagram of the optical system 500 including the thickness at the outer edges of each lens (e.g., an edge thickness). The last column of TABLE 1, headed "Edge Thickness," is the axial distance between that surface (second column) and the next surface at the edge of each surface. For example, in the embodiment illustrated in FIGS. 6A and 6B and TABLE 1, lens 511 has a thickness of approximately 76 microns at the outer edge (e.g., the axial distance between S2 and S3 at the edge of each surface). Similar data is shown for each lens 521, 531, 541 551, and 571. Other configurations are possible.

TABLE 1

| Item | Surface | Separation | Radius of Curvature (mm) | Material Type | Material Name | Aperture Diameter (mm) | Edge Thickness (mm) |
|---|---|---|---|---|---|---|---|
| 501 (Object) | | Infinity | Infinity | Air | | 590.4386 | 1000 |
| | S1 | 1 | Infinity | Air | | 4.758333 | 1.273753 |
| 510 | S2 | 0.3500014 | 6.095918* | Epoxy | HIMAX_UV1 | 4.012321 | 0.076249 |
| 510 | S3 | 0.6993104 | Infinity | Epoxy | HIMAX_UV1 | 3.971757 | 0.069931 |
| 510 | S4 | 0.3 | Infinity | Glass | HIMAX_GLASS | 3.934554 | 0.3 |
| | S5 | 0.02197424 | Infinity | Air | | 3.773095 | 0.352214 |

TABLE 1-continued

| Item | Surface | Separation | Radius of Curvature (mm) | Material Type | Material Name | Aperture Diameter (mm) | Edge Thickness (mm) |
|---|---|---|---|---|---|---|---|
| 520 | S6 | 0.3501069 | 4.65757* | Epoxy | HIMAX_UV1 | 3.471007 | 0.019867 |
| 520 | S7 | 0.06998862 | Infinity | Epoxy | HIMAX_UV1 | 3.454724 | 0.069989 |
| 520 | S8 | 0.3 | Infinity | Glass | HIMAX_GLASS | 3.397361 | 0.3 |
|  | S9 | 0.009977842 | Infinity | Air |  | 3.148838 | 0.009978 |
| 530 | S10 | 0.3 | Infinity | Glass | HIMAX_GLASS | 3.134743 | 0.3 |
| 530 | S11 | 0.06998188 | Infinity | Epoxy | HIMAX_UV2 | 2.887025 | 0.069982 |
| 530 | S12 | 0.06999121 | Infinity | Epoxy | HIMAX_UV2 | 2.831996 | 0.399890 |
|  | S13 | 0.06785719 | 2.673134* | Air |  | 2.51755 | 0.068401 |
| 540 | S14 | 0.3502304 | 2.862633* | Epoxy | HIMAX_UV1 | 2.471151 | 0.019787 |
| 540 | S15 | 0.07 | Infinity | Epoxy | HIMAX_UV1 | 2.454768 | 0.07 |
| 540 (Stop/Iris) | S16 | 0.3 | Infinity | Glass | HIMAX_GLASS | 2.396813 | 0.3 |
|  | S17 | 0.6280751 | Infinity | Air |  | 2.417507 | 0.628075 |
| 550 | S18 | 0.3 | Infinity | Glass | HIMAX_GLASS | 2.48287 | 0.3 |
| 550 | S19 | 0.07 | Infinity | Epoxy | HIMAX_UV3 | 2.503564 | 0.07 |
| 550 | S20 | 0.3500414 | Infinity | Epoxy | HIMAX_UV3 | 2.50836 | 0.0371247 |
|  | S21 | 0.0367513 | 24.60958* | Air |  | 2.533796 | 0.015546 |
| 560 | S22 | 3.4 | Infinity | Glass | BK7 | 2.537918 | 3.4 |
|  | S23 | 0.4008483 | Infinity | Air |  | 3.130248 | 0.20831 |
| 570 | S24 | 0.7 | 2.781673* | Epoxy | HIMAX_UV2 | 2.135772 | 0.450017 |
| 570 | S25 | 0.06999409 | Infinity | Epoxy | HIMAX_UV2 | 3.340772 | 0.069994 |
| 570 | S26 | 0.4 | Infinity | Glass | B33 | 3.372657 | 0.4 |
|  | S27 | 0.05 | Infinity | Air |  | 3.568381 | 0.05 |
| 580 (Image) |  | 0.0000 | Infinity | Air |  | 3.605645 | 0.0 |

Optical prescription data generated by the simulation software (for example, Zemax™ SW) is also provided in U.S. Patent Application Ser. No. 62/331,283 filed on May, 3, 2016, entitled "SYSTEMS AND DEVICES HAVING SINGLE-SIDED WAFER-LEVEL OPTICS," of which the present application claims the benefit to, the contents of which are both hereby incorporated by reference herein. This optical prescription data represents the embodiment illustrated in FIGS. 6A and 6B, which is only one embodiment of various other configurations that are possible based on the desired optical performance. It is noted, that the surface numbers included in the TABLE 1 of the optical prescription data corresponds to the surfaces of the various components illustrated in FIGS. 6A and 6B.

Figure 7:
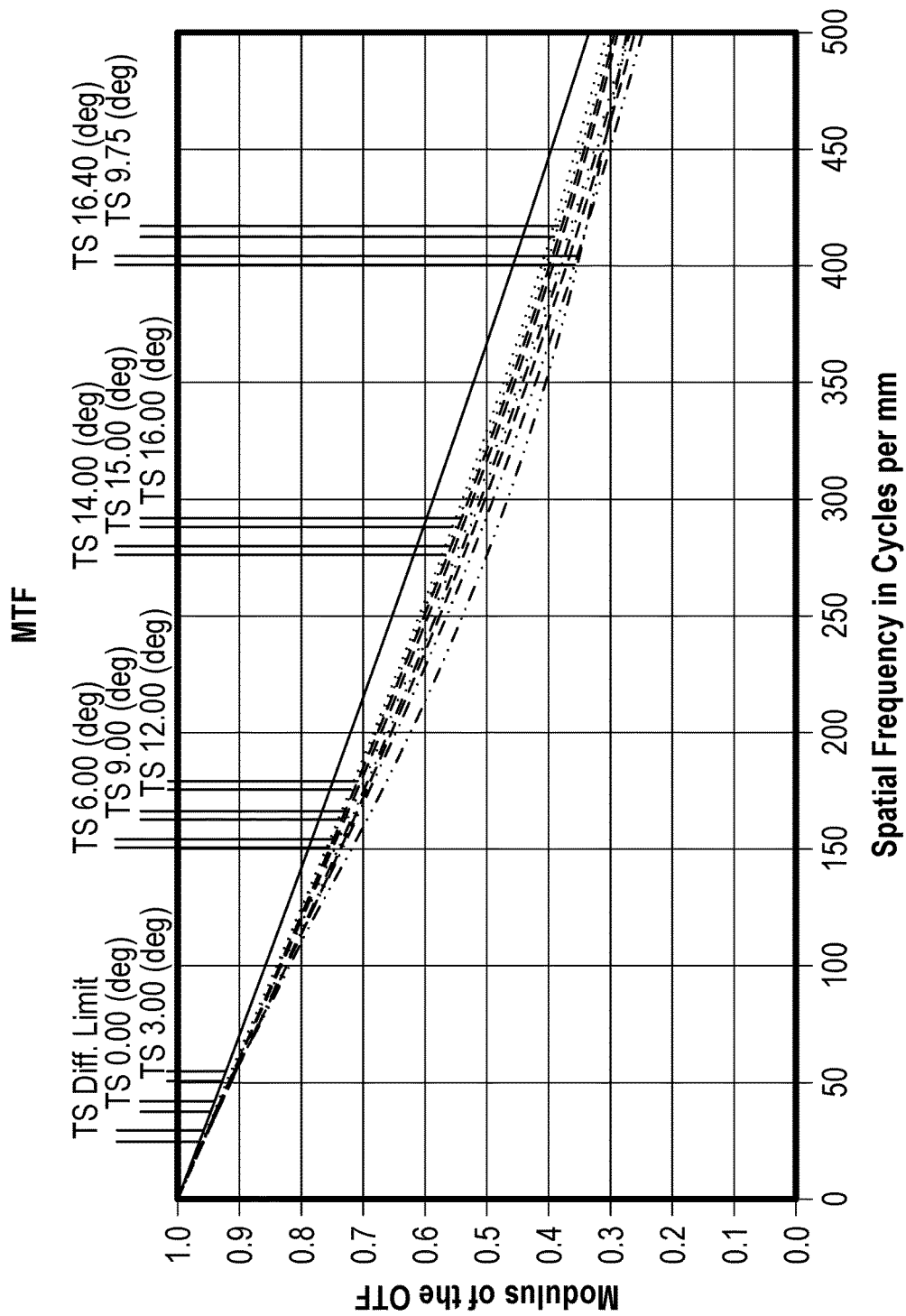
FIG. 7 illustrates an example of a Modulation Transfer Function (MTF) of the optical system embodiment illustrated in FIGS. 6A and 6B.

FIG. 7 illustrates a Modulation Transfer Function (MTF) of the example optical system illustrated in FIGS. 6A and 6B. The MTF graph of FIG. 7 illustrates the performance of the optical system 500 where the spatial frequency in cycles per mm is plotted against the modulus of the optical transfer function (OTF). Line TS Diff. Limit represents the best possible performance of the optical system (e.g., the diffraction limited performance). Line TS 0.00 (deg) represents the performance of optical system 500 for light that is incident parallel to the optical axis 590. The remaining lines represent the performance of the optical system 500 as light is incident on the optical system at various angles relative to the optical axis 590 (e.g., TS 3.00 (deg) may mean that the light is incident on the optical system 500 at an 3 degree angle off of the optical axis 590).

FIG. 8 illustrates an example table of tolerances of the example optical system of FIGS. 6A and 6B. The tolerances of FIG. 8 represent the permitted variations on the manufacturing specifications of the various components of the optical system 500. For example, the thickness of each buffer layer may be approximately 70 microns (see FIG. 6B) plus or minus 1 micron. Thus, the tolerances of FIG. 8 may represent the precision needed in producing a lens stack similar to that of FIGS. 6A and 6B.

FIG. 9 illustrates example tables of yield rates for the tolerances shown in FIG. 8 of the example optical system of FIGS. 6A and 6B. FIG. 9 shows the optical performance of the optical system 650 of FIGS. 6A and 6B that is modified within the tolerances of FIG. 8. The performance is based on the modulation transfer function (MTF) data (modulation versus spatial frequency) for percentages of yield rates of the optical system 650 modified within the tolerances of FIG. 8. FIG. 9 provides the performance with respect to two different spatial frequencies (e.g., 200 lines per millimeter and 450 LP/mm). For example, the optical system 650 may be modified within the tolerances of FIG. 8 to have a yield rate of 90% which has an MTF value of 0.416 for a spatial frequency of 200 LP/mm and an MTF value of 0.165 for spatial frequency of 450 LP/mm. The data shown in FIG. 9 is representative of the example optical system of FIGS. 6A and 6B, and may be different for different optical designs.

Figure 10:
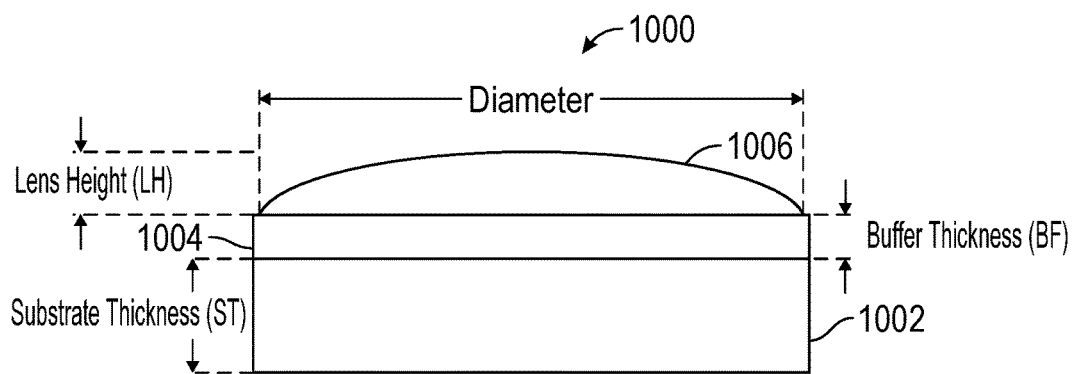
FIG. 10 illustrates a cross-sectional view of another embodiment of a single-sided wafer-level optics lens.

FIG. 10 illustrates a cross-sectional view of an example of an embodiment of a single-sided WLO lens. FIG. 10 depicts single-sided WLO 1000, which may be substantially similar to single-sided WLO 900 of FIG. 4. For example, single-sided WLO 1000 may comprise a substrate 1002, a buffer layer 1004, and a lens surface 1006. In some embodiments, substrate 1002 may be a wafer as described above. The substrate 1002 may have a substrate thickness ST, which may be between 200 microns and 1-2 millimeters thick. The buffer layer 1004 may be substantially similar to the buffer layer 913 of FIG. 4 and may have a buffer thickness BF. The single-sided WLO 1000 may have a diameter. In some embodiments, the diameter of single-sided WLO 1000 may be 5 mm or less. The lens surface 1006 may have a lens height of LH and may be similar to the lens surface 901 of FIG. 4. While lens surface 1006 is depicted with a particular lens shape (e.g., concave lens having a positive curvature), the lens surface 1006 may have any lens shape based on any radius of curvature, optical power, or lens height as needed for a given optical system design. Other configurations are possible, for example, as described in the optical prescription data included in Appendix A.

Figure 11:
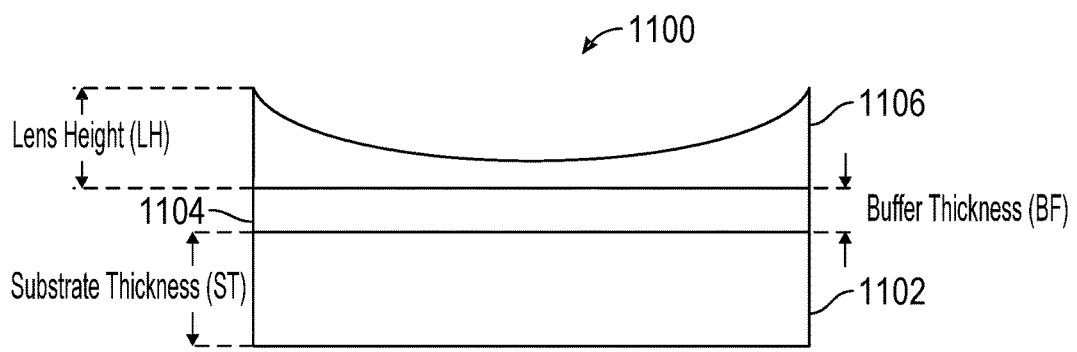
FIG. 11 illustrates a cross-sectional view of another embodiment of a single-sided wafer-level optics lens.
Figure 13:
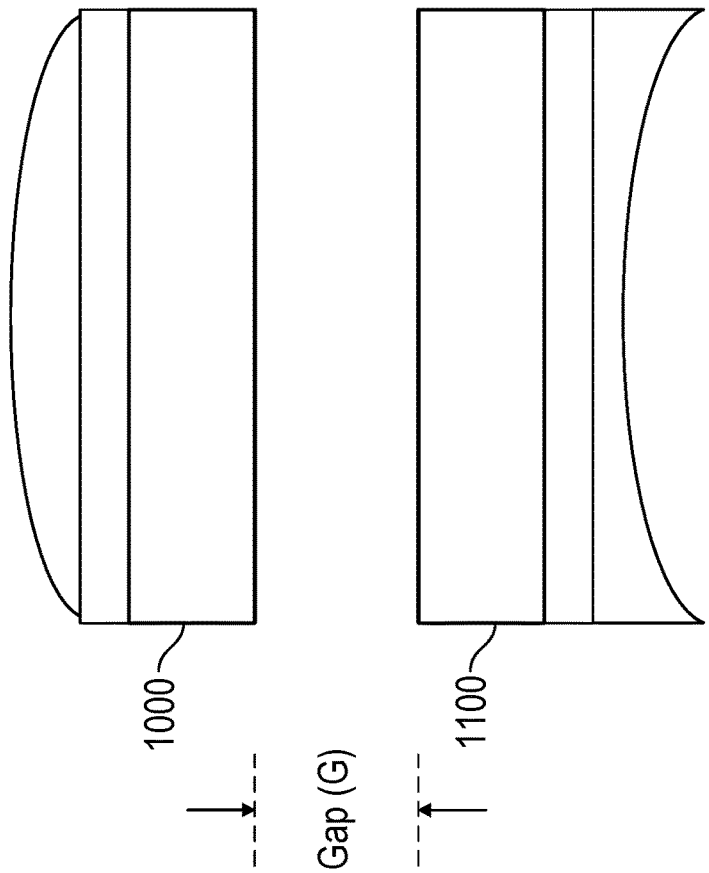
FIGS. 12-20 illustrate non-limiting examples of various embodiments of wafer-level optics lenses arranged together. These configurations may be included in implementations that include one or more other wafer level optics lenses that are single-sided. or double-sided, or other optical elements including "regular" (non-WLO) lenses.
Figure 12:
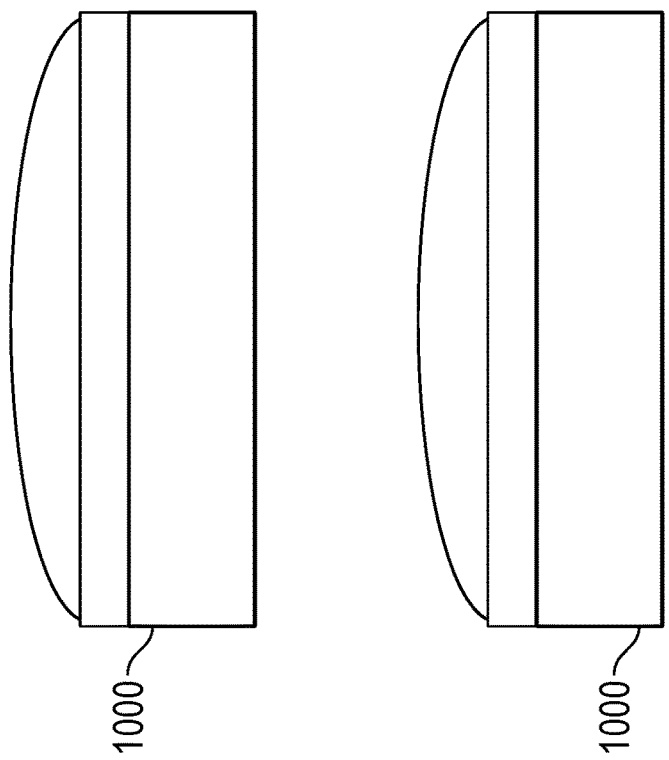
Figure 15:
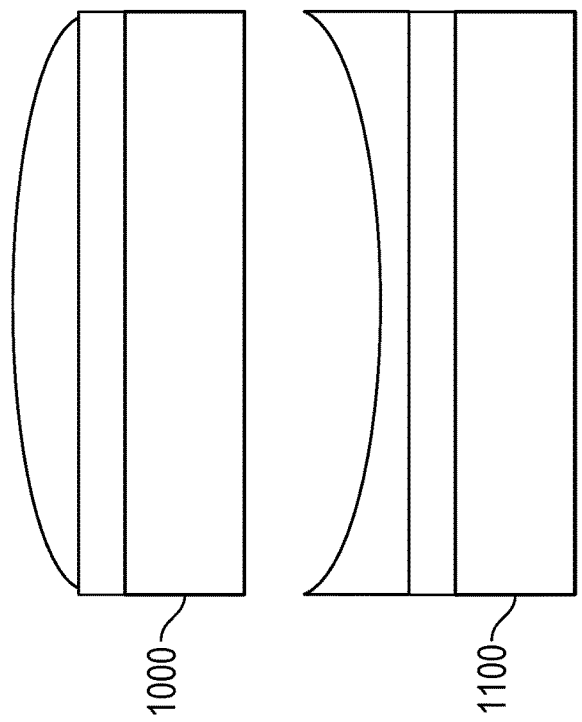
Figure 14:
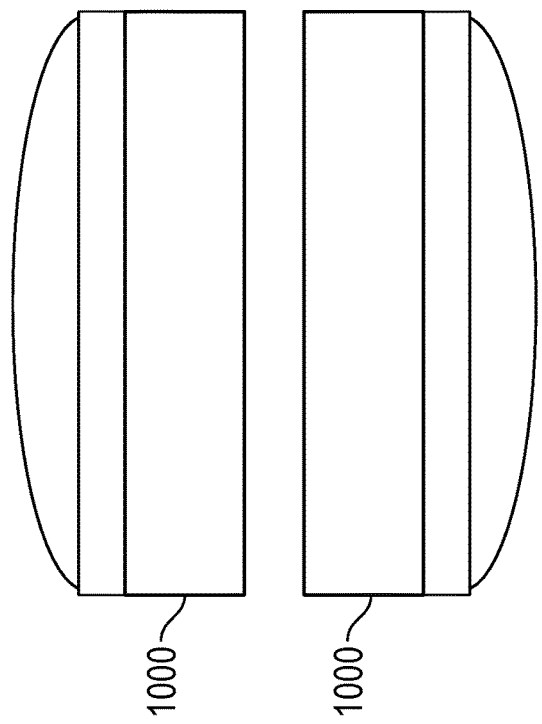
Figure 17:
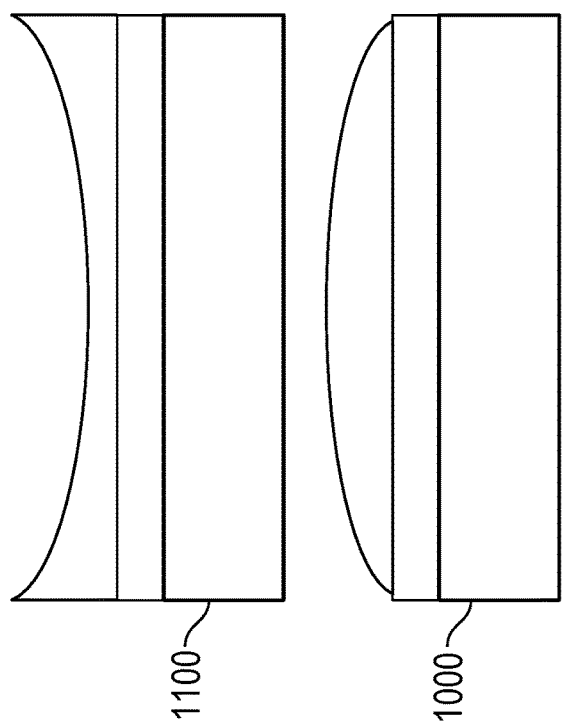
Figure 16:
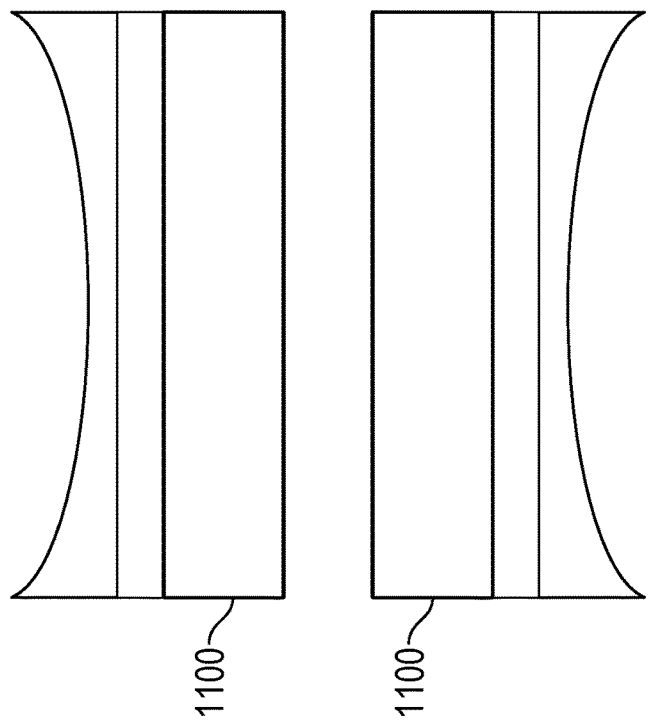
Figure 18:
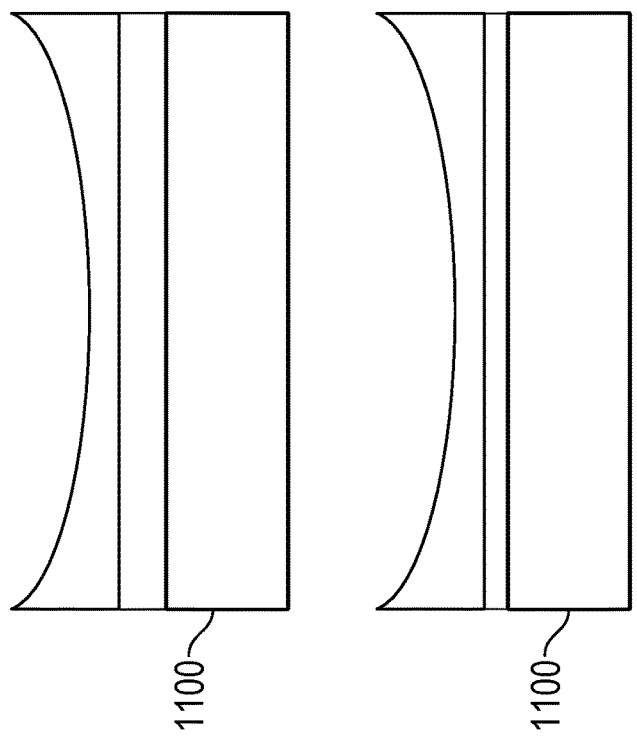
Figure 19:
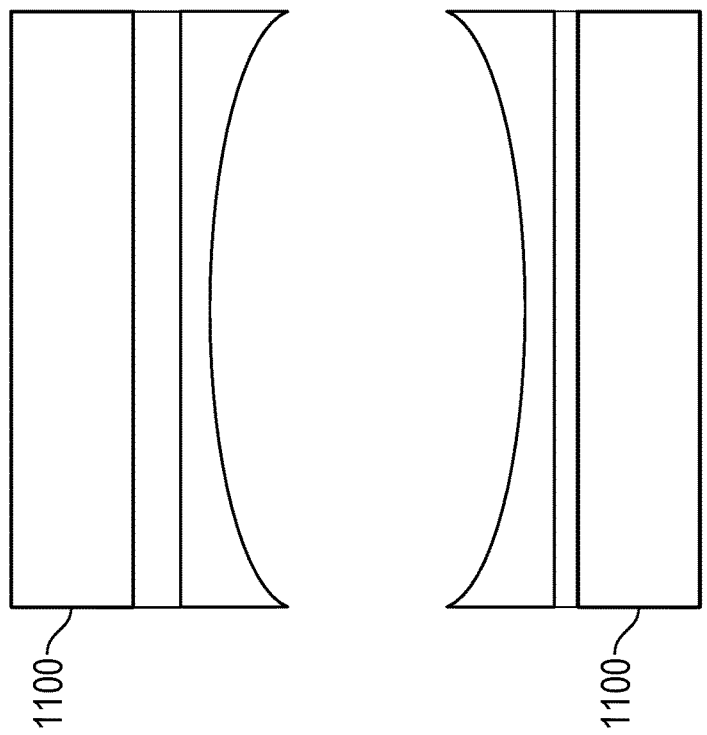

For example, FIG. 11 illustrates a cross-sectional view of another example of an embodiment of a single-sided WLO lens. FIG. 11 illustrates a single-sided WLO 1100 that may be substantially similar to single-sided WLO 900 of FIG. 4 and single-sided WLO 1000 of FIG. 10. Therefore, the above description in connection to FIGS. 9 and 10 applies equally to the single-sided WLO 1100. However, lens surface 1106 is illustrated as a convex lens surface having a negative radius of curvature. As described above, any radius of curvature or lens shape is possible as required for the desired optical power of the single-sided WLO 1100.

FIGS. 12-20 illustrate non-limiting examples of various configurations of examples of embodiments of WLO lenses arranged together. These configurations may be included in implementations that include one or more other WLO lenses that are single-sided or double-sided, or other optical elements including "regular" (non-WLO) lenses.

As illustrated in FIGS. 12-20, the various configurations may include multiple single-sided WLO's of various designs, lens surfaces of various radii of curvature and optical power. The multiple single-sided WLO's may be positioned adjacent to each other with a gap (G) between the adjacently arranged WLO's. In some embodiments, the gap may be configured during assembly of the lens stack. The gap may be of various thicknesses based on the desired optical performance specifications of the optical system, for example, as illustrated in FIG. 6A. In some embodiments, the gap may be adjusted to correct for aberrations or other optical defects resulting from wave properties of the light propagating through the optical system. In other embodiments, the gap may be minimal or zero based on bonding one or more single-sided WLO's through direct bonding techniques as described above (e.g., FIG. 14).

FIGS. 12-20 illustrate various configurations of a lens stack comprising two or more adjacently arranged single-sided WLO's. For example, a lens stack may comprise two singled-side WLO's 1000 (e.g., FIGS. 12 and 14), two single-sided WLO's 1100 (e.g., FIGS. 16, 18, and 19), or a combination of single-sided WLO'(e.g., FIGS. 13, 15, 17, and 20). In some embodiments, a lens stack may comprise adjacently arranged single-sided WLO's having a gap (G) therebetween (e.g., FIGS. 12, 13, 15, and 17-20) or a minimal gap or gap of zero value between substrates of the WLO's (e.g., FIGS. 14 and 16). A lens stack may comprise lens surfaces of adjacent WLO's arranged facing each other (e.g., FIG. 19), facing away from each other such that the substrates of each WLO faces each other (e.g., FIGS. 13, 14, and 16), or one lens surfaces of one WLO facing the substrate of an adjacent WLO (e.g., FIGS. 12, 15, 17, and 18).

Figure 20:
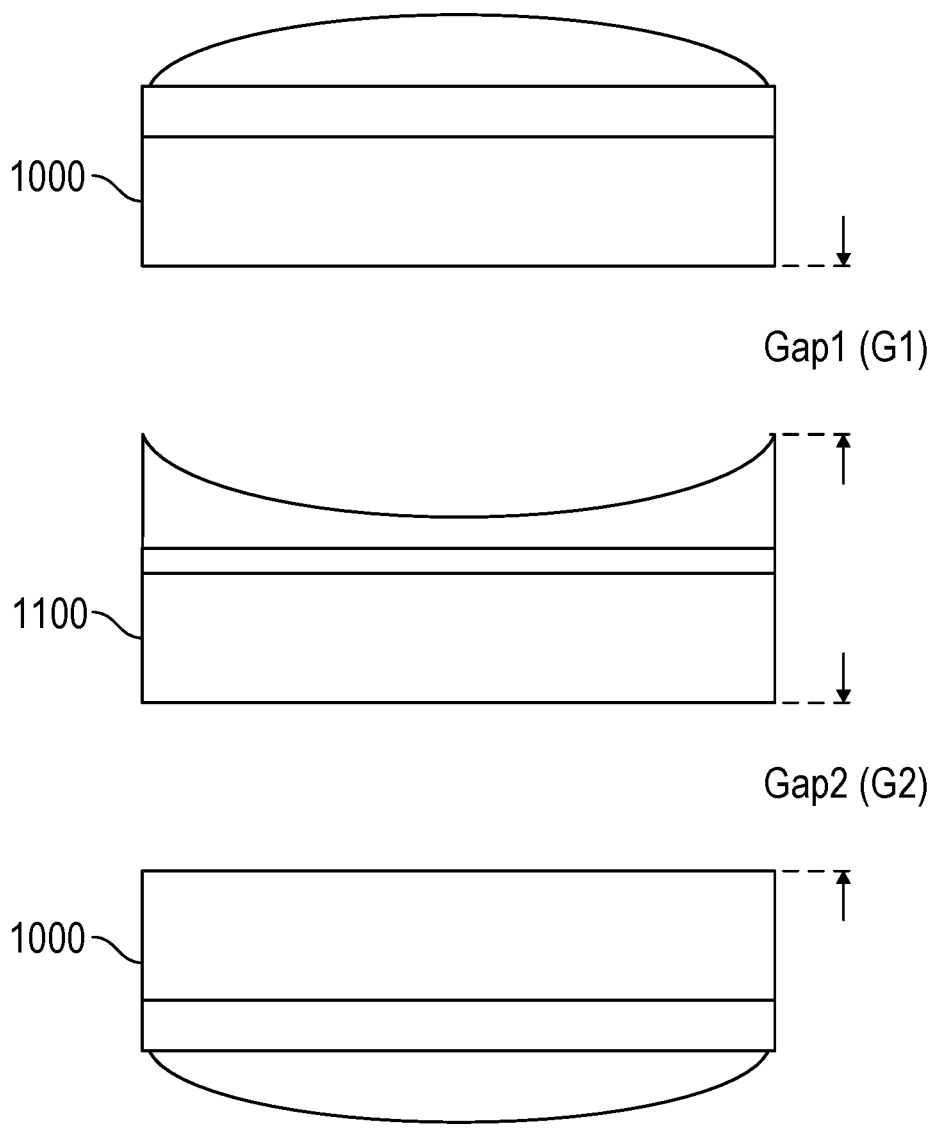

FIG. 20 illustrates a lens stack comprising two or more adjacent single-sided WLO's. For example, single-sided WLO 1000 may be adjacent to single-sided WLO 1100 having a gap (G1) therebetween. Further, single-side WLO 1100 may be adjacent to a second single-sided WLO 1000 having a gap (G2) therebetween, as shown in FIG. 20. While FIG. 20 illustrates two single-sided WLO's 1000 and one single-sided WLO 1100, other configurations are possible based on the design specifications of the optical system. For example, two or more single-sided WLO's 1100 may be included. In another embodiment, the number of WLO's need not be limited to three single-sided WLO's, the lens stack may include 4, 5, 6, 7, etc., single-sided WLO's. In another embodiment, the lens stack may include one or more double-sided WLO's, conventional lenses, or any other optical element for producing a high-resolution image.

Example Method of Fabricating an Optical System

Figure 21:
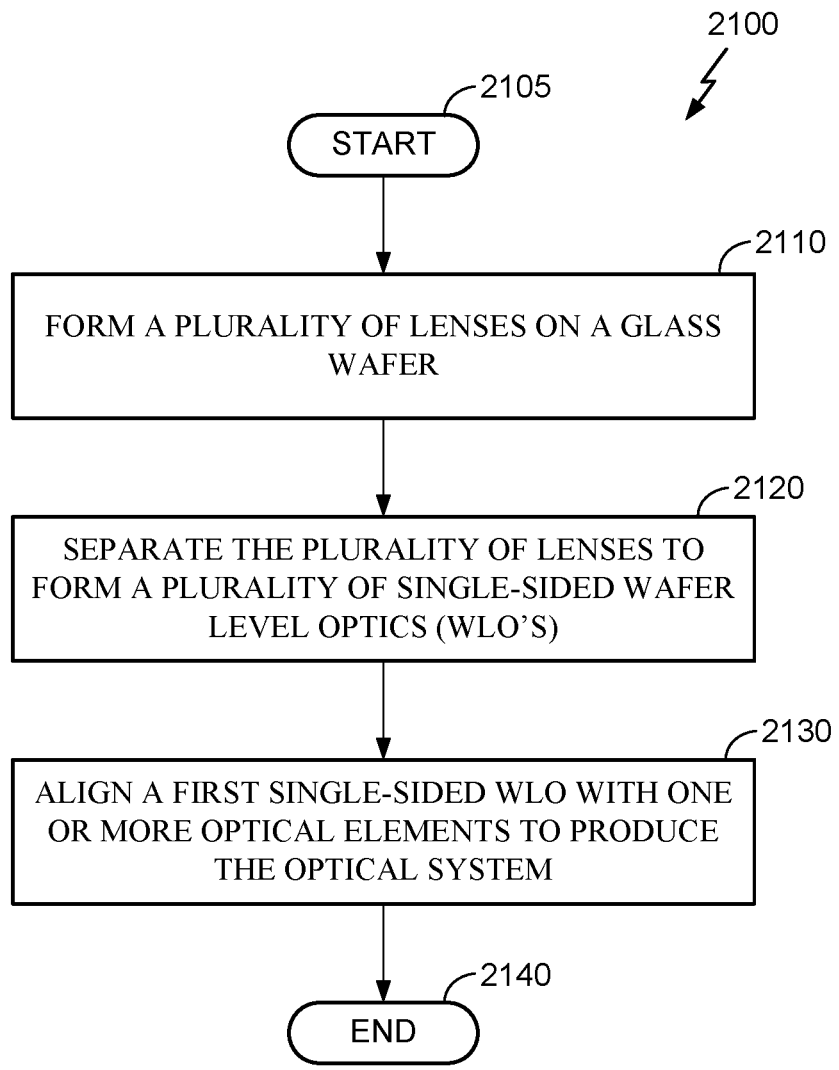
FIG. 21 is a flowchart of an example method of fabricating an optical system in accordance with some embodiments.

FIG. 21 is a flowchart of an example method 2100 of fabricating an optical system or lens stack in accordance with one embodiment. The method 2100 may be performed to fabricate any optical system or lens stack comprising one or more single-sided WLO. In some embodiments, the method 2100 may be used to fabricate one or more optical elements included in optical system 650 of FIGS. 6A and 6B. However, it will be understood that the optical systems and optical components disclosed herein are intended as example embodiments, and the specific optical prescription above is not intended to be limiting. The method 2100 may be implemented in conjunction with semiconductor fabrication techniques in accordance with embodiments disclosed herein.

The method 2100 begins at block 2105 and then moves to block 2110, where a plurality of lenses are formed on a glass substrate. In some embodiments, the each lens of the plurality of lenses comprises a lens surface disposed on a first side of the glass wafer, such that each lens is on top of an area of the glass surface associated with each lens. The plurality of lenses may be formed in a manner substantially similar to that described above in connection to FIG. 4. In some embodiments, a transparent material may be deposited on a first side of the glass wafer, either with or without a buffer layer therebetween. The plurality of lens surfaces may then be replicated onto the transparent material. In some embodiments, replicating the lens surface may induce a misalignment of the optical axis of the lens surface relative to the glass wafer.

Once the plurality of lenses are formed on the glass wafer, the method then moves to block 2120, where the plurality of lenses are separated or diced to form a plurality of individual single sided WLO's. In some embodiments, the plurality of individual single sided WLO's may be substantially similar to single-sided WLO 900 of FIG. 4, single-sided WLO 1000 of FIG. 10, single-sided WLO 1100 of FIG. 11, or a single-sided WLO of any shape. After the plurality of lenses are a separated into individual single-sided WLO's, a first single-sided WLO is aligned with one or more optical elements thereby forming an optical system. For example, a first single-sided WLO may be aligned with an image sensor, a reflective surface, another single-sided WLO, or any other optical element to form an optical system or lens stack. For example, multiple single-sided WLO's may be aligned to form an optical system 650 of FIGS. 6A and 6B. After the optical system is fabricated the method 2100 ends at block 2140.

In some implementations, the one or more optical element may comprise a second single-sided WLO having a lens surface formed on first side of a second glass wafer. The second single-sided WLO may be formed in a substantially similar manner as the first single-sided WLO described above. The second single-sided WLO may be formed from the same glass wafer as the first single-sided WLO or from a different glass water. In some embodiments, aligning the first single-sided WLO with the one or more optical elements comprises aligning the optical axis of lens surface of the first single-sided WLO with the optical axis of the lens surface of the second single-sided WLO. The first and second single-sided WLO's may then be attached by an adhesive layer, atomic or molecular forces, or any other means as described above in connection to FIGS. 4, 6A-20.

Implementing Systems and Terminology

Implementations disclosed herein provide systems, methods, and apparatus for submicron wafer alignment. One skilled in the art will recognize that these embodiments may be implemented in hardware, software, firmware, or any combination thereof.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Processor(s) in communication with (e.g., operating in collaboration with) the computer-readable medium (e.g., memory or other data storage device) may execute the instructions of the program code, and may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for imaging, encoding, and/or decoding. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Headings are included herein for reference and to aid in locating various sections. These headings are not intended to limit the scope of the concepts described with respect thereto. Such concepts may have applicability throughout the entire specification.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. An optical system, comprising:
a lens assembly including:

a first single-sided wafer level optics (WLO) lens formed on a first side of a first glass wafer;

a second single-sided WLO lens formed on a first side of a second glass wafer, wherein a second side of the first glass wafer is bonded to a second side of the second glass wafer; and a waveguide configured to adjust for aberrations, distortions, or diffractions of light, the waveguide positioned so as to receive light that propagates from at least one of the first glass wafer and the second glass wafer.

2. The optical system of claim 1, further comprising the image sensor, wherein the lens assembly is arranged relative to the image sensor to propagate light received at a first surface of the lens assembly, through the first and second single-sided WLO lenses and to the image sensor.

3. The optical system of claim 1, wherein the lens assembly includes at least three single-sided WLO lenses.

4. The optical system of claim 1, wherein the lens assembly includes at least four single-sided WLO lenses.

5. The optical system of claim 1, wherein the lens assembly includes at least five single-sided WLO lenses.

6. The optical system of claim 1, wherein the lens assembly includes at least six single-sided WLO lenses.

7. The optical system of claim 1, wherein the lens assembly includes at least seven single-sided WLO lenses.

8. The optical system of claim 1, wherein the lens assembly includes only single-sided WLO lenses.

9. The optical system of claim 1, further comprising a camera comprising the lens assembly and the image sensor.

10. The optical system of claim 1, wherein at least one of a surface of the first single-sided WLO lens and a surface of the second single-sided WLO lens is replicated of at least one of an epoxy and transparent material.

11. The optical system of claim 1, wherein the first single-sided WLO lens and the second single-sided WLO lens are arranged to propagate light in a substantially similar manner to one or more double-sided WLO lenses.

12. The optical system of claim 1, wherein the second side of the first glass wafer is bonded to the second side of the second glass wafer using at least one of atomic and molecular forces without an adhesive layer between the second side of the first glass wafer and the second side of the second glass wafer.

13. An optical system, comprising:
a lens assembly including:
two or more single-sided wafer level optics (WLO) lenses arranged to propagate light, wherein each single-sided WLO lens comprises:
a wafer having a first and second side, and
a lens surface replicated onto the first side of the wafer, wherein the second surface of each wafer of two single-sided WLO lenses are bonded; and
a waveguide configured to adjust for aberrations, distortions, or diffractions of light, the waveguide positioned so as to receive light that propagates from at least one of the two or more single-sided WLO lenses.

14. The optical system of claim 13, wherein the second surfaces do not include an adhesive therebetween.

15. The optical system of claim 13, wherein the second surface of the each wafer of the two single-sided WLO are bonded using at least one of atomic and molecular forces.

16. An optical system, comprising:
two or more single-sided wafer level optics (WLO) lenses, each single-sided WLO lens comprising:
a glass wafer having a first and second surface; and
a lens surface replicated onto a transparent material deposited on the first side of the glass wafer; and
a lens assembly comprising:
the two or more single-sided WLO lenses, wherein the second surface of each glass wafer of the two single-sided WLO lenses are bonded; and
a waveguide configured to adjust for aberrations, distortions, or diffractions of light, the waveguide, the waveguide positioned so as to receive light that propagates from at least one of the two or more single-sided WLO lenses;
wherein a first single-sided WLO of the two or more single-sided WLO comprising a lens having an optical axis that is tilted relative to a normal of the glass wafer.

17. The optical system of claim 16, wherein the second surfaces do not include an adhesive therebetween.

18. The optical system of claim 16, wherein the second surface of each glass wafer of the two single-sided WLO are bonded using at least one of atomic and molecular forces.

19. An optical system, comprising:
two or more single-sided wafer level optics (WLO) lenses, each single-sided WLO lens comprising:
a glass wafer having a first and second surface; and
a lens surface replicated onto a transparent material deposited on the first side of the glass wafer; and
a lens assembly comprising:
the two or more single-sided WLO lenses, wherein the second surface of each wafer of the two single-sided WLO lens are bonded without an adhesive layer between the second surface of each wafer of the two single-sided WLO lenses; and
a waveguide configured to adjust for aberrations, distortions, or diffractions of light, the waveguide positioned so as to receive light that propagates from at least one of the two or more single-sided WLO lenses.

20. The optical system of claim 19, wherein the second surface of each wafer of the two single-sided WLO are bonded using at least one of atomic and molecular forces.

21. A method of fabricating an optical system, comprising:
forming a plurality of lenses on a first glass wafer, each lens of the plurality of lenses comprising a lens surface disposed on a first side of the first glass wafer;
separating the plurality of lenses to form a plurality of single-sided wafer level optics (WLO) lenses;
aligning, after separating the plurality of lenses, a first single-sided WLO lens with one or more optical elements to produce the optical system, wherein the one or more optical elements comprises a second single-sided WLO lens having a lens surface disposed on a first side of a second glass wafer;
attaching a second side of the first glass wafer and a second side of the second glass wafer; and
positioning a waveguide such that the waveguide receives light that propagates from at least one of the first glass wafer and the second glass wafer, the waveguide configured to adjust for aberrations, distortions, or diffractions of light.

22. The method of claim 21, wherein forming the plurality of lenses further comprises:
depositing a transparent material on the first side of the first glass wafer; and
replicating the plurality of lens surfaces onto the transparent material.

23. The method of claim 21, wherein the one or more optical element comprises a second single-sided WLO lens having a lens surface formed on a first side of an area of a second glass wafer and having a second optical axis.

24. The method of claim 23, wherein a first optical axis of the first single-sided WLO lens is aligned with the second optical axis of the second single-sided WLO lens.

25. The method of claim 24, wherein the first optical axis is tilted relative to a normal of the first glass wafer.

26. The method of claim 21, wherein attaching the second side of the first glass wafer and the second side of the second glass wafer includes bonding using at least one of atomic and molecular forces without an adhesive layer between the second side of the first glass wafer and the second side of the second glass wafer.

27. A method of fabricating an optical system, comprising:
   forming a plurality of lenses on a glass wafer, each lens of the plurality of lenses comprising a lens surface disposed on a first side of the glass wafer;
   separating the plurality of lenses to form a plurality of single-sided wafer level optics (WLO) lenses, the plurality of single-sided WLO lenses including a first single-sided WLO lens and a second single-sided WLO lens;
   aligning, after separating the plurality of lenses, the first single-sided WLO lens with one or more optical elements to produce the optical system, the first single-sided WLO lens comprising a lens having an optical axis that is tilted relative to a normal of the glass wafer, wherein the one or more optical elements comprises the second single-sided WLO lens having a lens surface formed on a first side of a second glass wafer and having a second optical axis;
   attaching the first single-sided WLO lens and second single-sided WLO lens via bonding without an adhesive; and
   positioning a waveguide such that the waveguide receives light that propagates from at least one of the first single-sided WLO and the second single-sided WLO, the waveguide configured to adjust for aberrations, distortions, or diffractions of light.

28. The method of claim 27, wherein attaching the first single-sided WLO and the second single-sided WLO via bonding includes using at least one of atomic and molecular forces.

* * * * *